(12) United States Patent
Patnode et al.

(10) Patent No.: US 7,475,032 B1
(45) Date of Patent: Jan. 6, 2009

(54) SYSTEMS AND METHODS FOR CREATING FINANCIAL ADVICE APPLICATIONS

(75) Inventors: Roberta L. Patnode, St. Paul, MN (US); James Richard Geppert, St. Paul, MN (US); David Hoyt, Minneapolis, MN (US)

(73) Assignee: Ameriprise Financial, Inc., Minneapolis, MN (US)

( * ) Notice: Subject to any disclaimer, the term of this patent is extended or adjusted under 35 U.S.C. 154(b) by 627 days.

(21) Appl. No.: 09/712,743

(22) Filed: Nov. 14, 2000

Related U.S. Application Data

(60) Provisional application No. 60/165,693, filed on Nov. 16, 1999.

(51) Int. Cl.
G06Q 40/00 (2006.01)
(52) U.S. Cl. ............................. 705/36 R; 705/35
(58) Field of Classification Search ................ 709/203, 709/217, 218, 219, 229, 230, 231, 232; 705/35–40, 705/26
See application file for complete search history.

(56) References Cited

U.S. PATENT DOCUMENTS

| | | | |
|---|---|---|---|
| 5,319,543 A | 6/1994 | Wilhelm | |
| 5,319,777 A | 6/1994 | Peréz | |
| 5,361,199 A | 11/1994 | Shoquist et al. | |
| 5,371,675 A | 12/1994 | Greif et al. | |
| 5,410,634 A | 4/1995 | Li | |
| 5,410,693 A | 4/1995 | Yu et al. | |
| 5,452,416 A | 9/1995 | Hilton et al. | |
| 5,471,575 A | 11/1995 | Giansante | |
| 5,546,577 A | 8/1996 | Marlin et al. | |
| 5,611,048 A | 3/1997 | Jacobs et al. | |
| 5,649,192 A | 7/1997 | Stucky | |
| 5,652,908 A | 7/1997 | Douglas et al. | |
| 5,694,561 A | 12/1997 | Malamud et al. | |
| 5,774,881 A | 6/1998 | Friend et al. | |
| 5,819,263 A | 10/1998 | Bromley et al. | |
| 5,857,176 A | 1/1999 | Ginsberg | |
| 5,884,287 A | 3/1999 | Edesess | |
| 5,911,136 A | 6/1999 | Atkins | |
| 5,918,217 A * | 6/1999 | Maggioncalda et al. ... | 705/36 R |
| 5,933,815 A | 8/1999 | Golden | |
| 6,012,043 A | 1/2000 | Albright et al. | |
| 6,012,044 A | 1/2000 | Maggioncalda et al. | |

(Continued)

FOREIGN PATENT DOCUMENTS

WO  WO 99/28845  6/1999

OTHER PUBLICATIONS

Shaw, et al., "Microsoft Office 6 in 1", Que Corporation, (1994), pp. 608-609, 631-633, 713-717.

*Primary Examiner*—Hani M Kazimi
*Assistant Examiner*—Olabode Akintola
(74) *Attorney, Agent, or Firm*—Snell & Wilmer L.L.P.

(57) ABSTRACT

The present invention is a computer-implemented system and method for easily configuring new financial advice applications from various services and sub-applications in order to deliver consistent advice to consumers, clients, and advisors, regardless of the delivery mechanism utilized. In accordance with one aspect of the present invention, the system includes at least one client computer having an application program implemented thereon; an advice utility server in communication with the client computer and the application program; and at least one financial service in communication with the advice utility server, wherein each financial service is configured to receive/transmit data from/to the advice utility server.

32 Claims, 8 Drawing Sheets

U.S. PATENT DOCUMENTS

| | | | |
|---|---|---|---|
| 6,021,397 A * | 2/2000 | Jones et al. .................... 705/36 |
| 6,021,433 A * | 2/2000 | Payne et al. ................. 709/219 |
| 6,055,517 A | 4/2000 | Friend et al. |
| 6,058,376 A | 5/2000 | Crockett |
| 6,061,662 A | 5/2000 | Makivic |
| 6,064,984 A | 5/2000 | Ferguson et al. |
| 6,078,904 A | 6/2000 | Rebane |
| 6,085,175 A | 7/2000 | Gugel et al. |
| 6,115,691 A | 9/2000 | Ulwick |
| 6,125,355 A | 9/2000 | Bekaert et al. |
| 6,154,732 A | 11/2000 | Tarbox |
| 6,161,098 A | 12/2000 | Wallman |
| 6,219,650 B1 | 4/2001 | Friend et al. |
| 6,236,975 B1 * | 5/2001 | Boe et al. ....................... 705/7 |
| 6,240,399 B1 | 5/2001 | Frank et al. |
| 6,272,528 B1 * | 8/2001 | Cullen et al. ............... 705/36 R |
| 6,324,568 B1 * | 11/2001 | Diec .......................... 709/203 |
| 6,345,278 B1 * | 2/2002 | Hitchcock et al. ........... 707/100 |
| 6,349,290 B1 * | 2/2002 | Horowitz et al. .............. 705/35 |
| 6,430,542 B1 * | 8/2002 | Moran ...................... 705/36 R |
| 6,473,745 B2 * | 10/2002 | Doerr et al. .................. 706/11 |
| 6,513,019 B2 * | 1/2003 | Lewis ......................... 705/35 |
| 6,557,026 B1 * | 4/2003 | Stephens, Jr. ............... 709/203 |
| 6,564,251 B2 * | 5/2003 | Katariya et al. ............. 709/214 |
| 6,606,606 B2 * | 8/2003 | Starr .......................... 705/35 |
| 7,003,546 B1 * | 2/2006 | Cheah et al. ................ 709/200 |
| 2001/0011222 A1 * | 8/2001 | McLauchlin et al. ........... 705/1 |

\* cited by examiner

SYSTEMS AND METHODS FOR CREATING FINANCIAL ADVICE APPLICATIONS

CROSS REFERENCE TO RELATED APPLICATION

This application claims benefit from provisional application Ser. No. 60/165,693, filed Nov. 16, 1999, which is hereby incorporated by reference in its entirety.

TECHNICAL FIELD OF THE INVENTION

The present invention relates generally to financial information and, more particularly, to the creation of financial advice applications for delivering consistent financial advice information across a plurality of delivery channels.

BACKGROUND OF THE INVENTION

Corporations which provide financial advice to clients and consumers, either directly or through financial professionals, typically place a premium upon the delivery of consistent and complementary advice across the various channels that may be available for delivering such advice. Financial planners and planning organizations generally provide their clients with financial advice such as data, strategies, and recommendations. In addition to utilizing charts, graphs, and other visual aids for presenting this financial advice to clients, financial planners and planning organizations often use specialized calculators, simulators, formatters, and the like to augment the depth and quality of the proffered financial advice. Moreover, due to various Security and Exchange Commission, insurance, financial, legal, and other complex disclosure requirements, the financial data generated during the financial planning process should be appropriately archived, and the financial advice information delivered to the client should include the proper disclosures, disclaimers, and the like.

In the light of these many requirements, the creation of new or specialized financial planning applications which target particular market segments can be costly in terms of both financial expenditures and the time and effort needed to create the applications. In this respect, the prior art has proved disadvantageous in several regards. The architecture of prior art systems generally requires separate financial advice applications for each target market. For example, consumers receiving advice remotely through the Internet and consumers receiving advice directly from professional advisors may receive different advice due to the specific functionality available through the particular financial application used to generate the advice. Thus, the consistency of the advice proffered by a single financial planning organization is frequently compromised by poor integration of the various modes of delivering financial planning advice. Moreover, this lack of integration substantially precludes the effective bundling of application functionalities to create specialized financial advice applications for particular target markets or market segments.

It therefore is desirable to create a system for creating financial advice applications that is easily configurable, centrally controllable, and capable of providing consistent financial advice and information to a broad spectrum of users, such as consumers, clients, and financial planners. Moreover, it is desirable to provide a system which is platform independent and capable of being accessed by application developers using a variety of technologies, programming languages, and methodologies. Additionally, it is desirable to provide a system that is capable of providing specialized financial advice applications that address the financial planning needs of particular market segments of clients.

SUMMARY

Various aspects of the present invention relate to computer-implemented systems and methods for easily configuring new financial advice applications from various services and sub-applications in order to deliver consistent advice to consumers, clients, and advisors, regardless of the delivery mechanism utilized. In accordance with one aspect of the present invention, the system includes at least one client computer having an application program implemented thereon; an advice utility server in communication with the client computer and the application program; and at least one financial service in communication with the advice utility server, wherein each financial service is suitably configured to receive/transmit data from/to the advice utility server.

In accordance with another aspect of the present invention, the method suitably includes establishing a connection to an application program having at least one module which corresponds to a financial services function; receiving a request from the application program for financial services data; establishing a connection to an application services manager such that data is capable of being transmitted between the application program and the application services manager; transmitting a request to the application services manager for said financial services data; establishing a connection between the application services manager and at least one financial service such that data is capable of being transmitted between the application services manager and the financial service; receiving and compiling the financial services data from the application services manager; and transmitting the financial services data to the application program.

BRIEF DESCRIPTION OF THE DRAWINGS

Additional aspects of the present invention will become evident upon reviewing the non-limiting embodiments described in the specification and the claims, in conjunction with the accompanying figures, wherein like numerals designate like elements, and wherein:

DETAILED DESCRIPTION OF EXEMPLARY EMBODIMENTS

Figure 1:
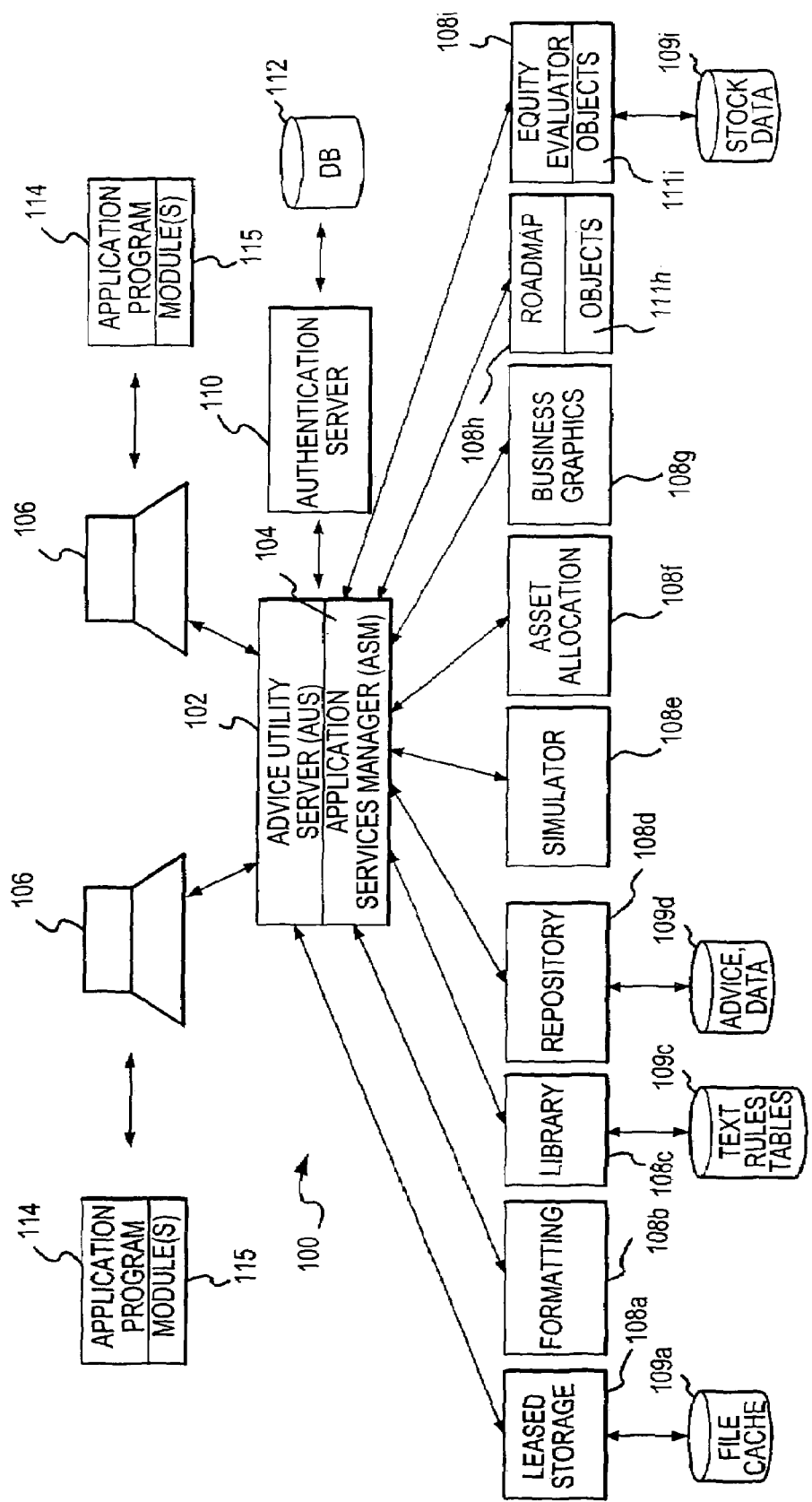
FIG. 1 is a schematic block diagram illustrating an exemplary system for creating financial advice applications in accordance with various aspects of the present invention.

The present invention may be described herein in terms of functional block components and various processing steps. It should be appreciated that such functional blocks may be realized by any number of hardware and/or software components configured to perform the specified functions. For example, the present invention may employ various integrated circuit components, such as memory elements, processing elements, logic elements, look-up tables, and the like, which may perform a variety of functions under the control of one or more microprocessors or other control devices. Similarly, the software elements of the present invention may be implemented with any programming or scripting language, such as C, C++, Java, COBOL, assembler, PERL, or the like, with the various algorithms being implemented with any combination of data structures, objects, processes, routines, or other programming elements. Further, it should be noted that the present invention may employ any number of conventional techniques for data transmission, signaling, data processing, network control, and the like. For a basic introduction to cryptography, please review a text written by Bruce Schneider which is entitled "Applied Cryptography: Protocols, Algorithms, And Source Code In C," published by John Wiley & Sons (second edition, 1996), which is hereby incorporated by reference in its entirety.

It should be appreciated that the particular implementations shown and described herein are illustrative of the invention and its best mode and are not intended to otherwise limit the scope of the present invention in any way. Indeed, for the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system for creating financial advice applications.

It will be appreciated that many applications of the present invention could be formulated. It will be further appreciated that the network may include any system for exchanging data or accomplishing financial transaction, such as the Internet, an intranet, an extranet, WAN, LAN, satellite communications, and/or the like. The users may interact with the system via any input device such as a keyboard, mouse, kiosk, personal digital assistant, handheld computer (e.g., PALM PILOT computer), cellular phone, and/or the like. Similarly, the invention could be used in conjunction with any type of personal computer, network computer, workstation, minicomputer, mainframe, or the like running any operating system such as any version of Windows, Windows NT, Windows 2000, Windows 98, Windows 95, MacOS, OS/2, BeOS, Linux, UNIX, or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the creation and use of financial advice applications over any network having similar functionality described herein.

As will be appreciated, the present invention may be embodied as a method, a data processing system, a device for data processing, a computer program product, or in any other manner. Accordingly, the present invention may take the form of a software embodiment, a hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, digital memory, and/or the like.

The present invention is described below with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Various embodiments of the present invention include computer-implemented systems and methods for easily configuring new applications from various services or sub-applications to deliver consistent financial advice to consumers, clients, and advisors, regardless of the delivery mechanism employed in the dissemination of such advice. The "services" may include sub-applications, sub-databases, sub-utilities, sub-services, and the like which are used for accomplishing any of several financial planning activities, which may include, but are not limited to, calculations, simulation, formatting and graphics, data entry, language and currency conversions, tracking, asset allocation, stock portfolio analyses, and/or other suitable activities. A discussion of various examples of suitable financial services can be found in, for example, U.S. Pat. No. 5,819,263, entitled "Incorporating Relationship and Group Management", by inventors David A. Brounley and Howard A. Hallin, issued on Oct. 6, 1998, and U.S. Utility patent application Ser. No. 09/141,013 entitled "Computer-implemented Program For Financial Planning and Advice System" by inventor William J. Moran, the entire contents of both of which are incorporated herein by reference.

The term "client", as used herein, unless specifically stated otherwise, refers to any device capable of interacting with the system of the present invention, such as a personal computer, personal digital assistant, laptop computer, network computer, workstation, minicomputer, mainframe, and/or the like. One skilled in the art further will appreciate that the term "consumer", as used herein, includes any end-user of either a financial advice application created by the system of the present invention or financial advice based upon the use of a financial advice application created by the system of the present invention. Such end-user may be an individual, an entity, a business, a financial professional, and/or the like. Similarly, an "economic group", as used herein, may include an individual, an entity, a business, a family, and/or any other suitable association of members for whom a particular end-user of financial advice applications created by the present system may be seeking financial planning and advice information. Likewise "economic group data", as used herein, may include membership data pertaining to the members of the economic group, demographics data regarding the members of the economic group, and/or financial data pertaining to the economic group.

FIG. 1 is a block diagram illustrating an exemplary system 100 for creating financial advice applications. The system 100 includes an Advice Utility Server (AUS) 102 including an Application Services Manager (ASM) 104 in communication with any suitable number of client systems 106 and any suitable number of financial services 108. The system architecture also suitably permits importation of any suitable third party services, tools, or applications for use by AUS 102, client systems 106, and/or financial services 108. The AUS 102 suitably provides a framework for handling client/server conversations by listening for requests from multiple clients and spawning threads to handle each client conversation. The AUS 102 may also provide mechanisms for maintaining contextual information across connections, thereby providing a virtual conversation across many requests. The AUS 102 may be any suitable type of server, including a loop back server for example.

In an exemplary embodiment, communication between the various components of the system 100, including AUS 102, client systems 106, and financial services 108, may be implemented through one or more communications networks, such as a private extranet, a public Internet, and/or a third party extranet, though it will be recognized that other networks, such as a public switch telephone network (PSTN), may be utilized in alternative embodiments. In another exemplary embodiment, the connection between AUS 102 and client systems 106 may be implemented through appropriate socket connections that embody a suitable protocol for sending messages to and from the AUS 102 and the client systems 106. Moreover, although the present invention may be suitably implemented with TCP/IP protocols, it will be readily appreciated that the invention also can be implemented using any number of other protocols, as described above. Further, in another exemplary embodiment, client systems 106 may be implemented by any suitable type of computing device, including any type of personal computer, point of interaction device, network computer, workstation, minicomputer, mainframe, and/or the like, which implementation may include a suitable browser application, such as a World Wide Web (Web) browser, which may include a suitable encryption capability.

In one embodiment, AUS 102 communicates with a suitable authentication server 110, such as the American Express® DSS Service, for authenticating or authorizing use of the system 100 by a client system 106 and/or application program 114. Authentication server 110 can include a database 112 for storing appropriate data used in authenticating a client system 106 and/or application program 114. Database 112 may be any suitable database, including an object-oriented database, a relational database, and/or the like. Any suitable authenticating data may be stored in database 112 and may include data such as a client identification number, a password, a pass phrase, any combination of these, and/or the like.

In an exemplary embodiment, ASM 104 provides centralized routing of information and data through the system 100 and, in particular, to financial services 108. Client systems 106 connect to the system 100 through ASM 104 and subsequently transmit requests to the ASM 104. In an alternate embodiment, client systems 106 do not connect directly to any of the financial services 108. The ASM 104 receives requests from client systems 106, determines which financial service(s) 108 is(are) capable of processing the request, connects to the appropriate financial service(s) 108, and then forwards the request to that(those) financial service(s) 108. Thus, client systems 106 need not have any information regarding where a particular financial service 108 resides within the system 100. In another exemplary embodiment, the ASM 104 uses Java, which is object-oriented and platform independent, and Extensible Markup Language (XML) to manage data flow between the financial services 108 and the user interfaces of client systems 106. In another exemplary embodiment, ASM 104 is configured to script requests from application program 114 such that a single request suitably creates a financial advice application including data from a plurality of financial services 108. For example, a single script might request a set of functionality which includes data from the repository service 108d, the simulator service 108g, and the formatting service 108b.

In an exemplary embodiment, each client system 106 corresponds to one or more users, such as application developers, and includes a suitable application program 114 for creating, in conjunction with ASM 104, new financial advice applications for use by consumers. Application program 114 provides a suitable user interface for client system 106 and can include any number of suitable modules 115 for use in creating new financial applications. Application program 114 can be written in any suitable programming or scripting language such as C, C++, Java, COBOL, assembler, PERL, or the like, with the various algorithms being implemented with any combination of data structures, objects, processes, routines or other programming elements. Additionally, application program 114 can be implemented on any suitable platform capable of communicating with the interface of system 100, including DOS/PC/Windows, Macintosh, OS/2, Unix/LINUX/X-Windows, and/or any other suitable platform or system. Preferably, each module 115 of application program 114 corresponds to at least one financial service 108.

The system of the present invention permits an application developer to create a variety of financial advice applications which correspond to the financial needs and/or preferred financial strategies of different classes of consumers who are seeking financial advice on behalf of a particular economic group. For example, application developers may create new financial advice applications by bundling or combining existing financial services 108 in a manner designed to address the needs of particular classes of economic groups, such as young professionals, retirees, families, and/or the like. In an exemplary embodiment, the financial services 108 are headless utilities which each provide a specialized function within the context of providing financial advice to consumers. Financial services 108 includes, for example, at least one of a leased storage service 108*a*, a formatting service 108*b*, a library service 108*c*, a repository service 108*d*, a simulator service 108*e*, an asset allocation service 108*f*, a business graphics service 108*g*, a roadmap service 108*h*, and an equity evaluator service 108*i*. Examples of additional financial services may include calculator services, data entry services, information services, conversion services, tracking services, and the like. The financial services 108*a-i* each may include or communicate with one or more databases, such as databases 109*a*, 109*c*, 109*d*, and 109*i*, for example.

An exemplary calculation service provides foundation tools, such as a mortgage calculator, an equity calculator, an asset mix calculator, and the like. An exemplary data entry service enables input and maintenance of advice assumptions and includes rules, text, constraints, and consumer financial data for all assets, liabilities, income, policies, and expenses. An exemplary information service provides suitable links to other databases and suitable third party information, such as information related to financial advice. An exemplary conversion service converts relevant data from outdated applications, third party software, and/or other financial organizations. An exemplary tracking service enables the system administrator to track the manner in which financial advice applications are being employed by users of the system and to relate the use of the financial advice applications to other data stored by the system administrator, such as a suitable financial planning organization.

Figure 2:
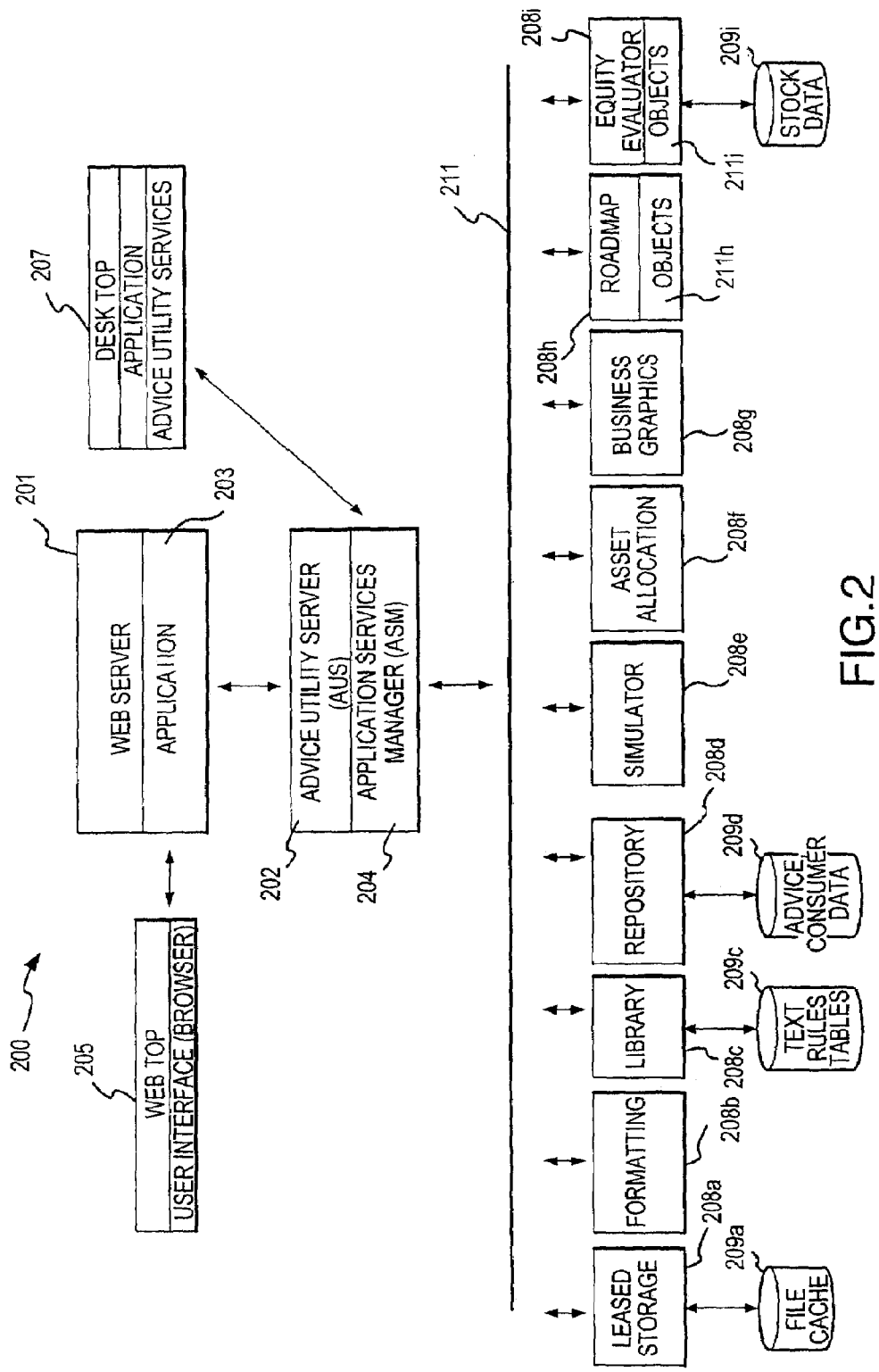
FIG. 2 is a schematic block diagram illustrating an exemplary system for using financial applications created by the system of FIG. 1.

FIG. 2 is a block diagram illustrating an exemplary system 200 for using the financial advice applications created by the system 100 of FIG. 1. System 200 suitably includes a Web server 201 having a Web server application 203 implemented thereon; an AUS 202 including an ASM 204; a computing device 205 having a user interface, such as a browser application; a computing device 207 having application software implemented thereon; a system bus 211; financial services 208*a-i*; and databases 209*a*, 209*c*, 209*d*, and 209*i* in communication with financial services 208*a*, 208*c*, 208*d*, and 208*i*, respectively. Computing device 205 may correspond to any user of the system 200. In an exemplary embodiment, computing device 205 corresponds to a consumer who is seeking financial advice. Computing device 207 may correspond to any suitable user of the system 200. In an exemplary embodiment, computing device 207 corresponds to a financial advisor, financial planning organization, and/or other financial professional. The system 200 may be implemented with any suitable type of computing device, communications network, and programming or scripting language, as set forth above with reference to FIG. 1.

In an exemplary embodiment, client systems, such as consumer client system 205 and professional client system 207, suitably access the AUS 202. A user of client system 205 accesses AUS 202 via Web server 201 through a suitable browser application implemented on client system 205. The communication link between client system 205 and Web server 201 may be any suitable communication link, as described above. Client system 205 and Web server 201 are connected through a suitable Hypertext Transfer Protocol (HTTP). Once connected to Web server 201, client system 205 accesses a suitable financial advice application 203 resident at the Web server 201. Client system 207 may access AUS 202 in any suitable manner. In one embodiment, client system 207 directly accesses AUS 202 through any suitable network connection, as described above. Unlike client system 205, client system 207 may have financial advice applications implemented on its desktop.

In an exemplary embodiment, financial advice applications available on the Web server 201 and/or the desktop of client system 207 are designed to target particular segments of the financial services market. Client systems 205 and 207 may select a financial advice application that corresponds to the financial needs and/or preferred financial strategies of the user and/or economic groups who are seeking financial advice. For example, targeted financial advice applications available to client systems 205 and 207 may suitably bundle particular financial services 208 in a manner designed to address the needs of particular classes or categories of economic groups, such as young professionals, retirees, families, and/or the like.

In an exemplary embodiment, data transmitted between the AUS 202 and either Web server 201 or client system 207 is in a suitable standardized data format, such as XML for example. Once suitably connected to the AUS 202 and ASM 204, the client systems 205 and 207 may suitably access financial information and advice by suitably transmitting requests, through the financial advice application, to the financial services 208*a-i* via ASM 204. In an exemplary embodiment, the financial services 208 are controlled by the AUS 202 and are located on a server (or multiple servers). The ASM 204 suitably transmits "service packets" to the relevant financial services 208 in response to requests for data and/or services, such as mathematical models, calculations, simulations, advice, and/or the like, from the client systems 205 and 207. Intermediate results transmitted by the financial services 208 to the ASM 204 may be held in a suitable "context" such that the ASM 204 distinguishes the source of the initial request, such as a consumer client system 205 or professional client system 207, and the appropriate format for transmitting a final result to that source. The financial services 208 suitably include any service or database configured to provide information and applications to the ASM 204 for inclusion in a financial advice application made available to a consumer, a financial professional, and/or the like.

An exemplary Leased Storage Service (LSS) 208*a* suitably allocates temporary storage for short lived (such as 5 minutes or 1 hour, for example) objects, such as binary, character, or string objects for example, which are being used by either financial services 208 or client systems 205 and 207. LSS 208*a* may use a file system to store objects associated with some expiration period in a file cache, such as database 209*a*. Database 209*a* may be any suitable database, including an object-oriented database, a relational database, and/or the like. When the expiration period lapses, the file becomes eligible for deletion by a suitable daemon which periodically scours the pool of temporarily stored objects in an effort to locate suitable deletion candidates. In one embodiment, client systems 205 and 207 can retrieve objects stored by the LSS 208*a* and/or can renew the lease for any suitable period of time. Client systems 205 and 207 may find it advantageous to renew the storage period while retrieving the stored object, since the retrieval might suggest that a new or continuing need for the object is likely. In another exemplary embodiment, a checksum calculator may be provided, which can be used by the client systems 205 and 207 to find a checksum value for the file being cached. This checksum then can be used as a file storage name which can be given to the LSS 208*a* so that client systems 205 and 207 can effectively "cache" work in the LSS 208*a* and/or database 209*a*.

An exemplary formatting service 208*b* creates and implements rules for presenting information (such as including suitable disclaimers with charts, tables, and graphs for example) and formatting data (such as textual and graphical data pertaining to financial advice and planning) in a desired configuration. In an exemplary embodiment, ASM 204 transmits meta-formatted data and style instructions to the formatting service 208*b*. The meta-formatted data may be in a standardized data format, such as XML for example. The formatting service 208*b* then suitably transmits formatted information to the ASM 204, which formatted information is then transmitted from the ASM 204 to the requesting client system 205 or 207 and presented to the user. The system 200 receives information, such as financial data, from the consumer and generates other information, such as financial advice and strategies, which is conveyed to the consumer and which enables the consumer to plan for the financial future of the economic group that is the subject of the advice. In an exemplary embodiment, the data received by formatting service 208*b* includes a data file which may include style information. The data file may be in any suitable form. In an exemplary embodiment, the data file is in a standardized data format, such as XML. The style information may be any suitable style information, such as style information which conveys any presentation requirements to the formatting service 208*b*. The style information transmitted to the formatting service 208*b* may include a style sheet and information regarding any particular language characteristics that might apply to a particular formatting request, such as if the results are to be formatted in a language other than English for example. Data transmitted by the formatting service 208*b* to client systems 205 and 207 may be in any suitable form, such as Hypertext Markup Language (HTML), Portable Document Format (PDF), Graphics Interchange Format (GIF), Joint Photographic Experts Group (JPEG), and/or the like.

In an exemplary embodiment, formatting service 208*b* may receive data from other financial services 208, which data may contain a combination of results, such as textual advice and the results of mathematical calculations, and/or be formatted in a particular style. The formatting service 208*b* may receive data from other financial services 208 directly, via system bus 211, or the data may be routed through ASM 204. The formatting service 208*b* then suitably formats the data to generate a uniform, formatted file, such as an HTML document or an Extensible Hypertext Markup Language (XHTML) document for example, having suitable presentation characteristics, such as suitable graphs, charts, tables, snippets (described below with reference to library service 208*c*), language requirements, and/or the like. One skilled in the art will appreciate that XHTML is a variation of HTML which conforms to the formatting rules of XML and therefore allows data to be easily parsed, manipulated, edited, and displayed.

In an exemplary embodiment, the formatting service 208*b* may operate in conjunction with the LSS 208*a*. In this embodiment, the formatting service 208*b* may suitably enable server-side caching through the use of LSS 208*a*. When the formatting service 208*b* performs a significant task, such as the generation of XHTML or the creation of a GIF, for example, the formatting service 208*b* suitably stores the created file in LSS 208*a* under a key that uniquely reflects the data used to create the stored file. The file is stored temporarily, and the storage period expires at the end of a predefined period of time. The predefined storage period may be any suitable period of time, such as a period that is based upon the particular characteristics of the stored data, such as the amount of memory associated with the data, and/or the particular circumstances of a given application or use. For example, the storage space may be leased for 30 minutes for XHTML documents and 35 minutes for GIF files. Thereafter, when an object of the formatting service 208*b* receives a request, the formatting service object may query LSS 208*a* to determine whether LSS 208*a* has stored data corresponding to the given request. If LSS 208*b* has stored data corresponding to the request, the formatting service object suitably retrieves the data from LSS 208*a*, which retrieval can cause the lease to be renewed for an additional pre-defined period of time, and transmits the data to the client of the formatting service 208*b*, such as client systems 205 and 207. If the requested data is not found in LSS 208*b*, the formatting service object then may suitably create the data corresponding to the request.

An exemplary library service 208*c* retrieves static objects, such as library files or documents, from database 209*c*. Library service 208*c* may contain any suitable files for use by components or users of the system 200, such as client systems 205 and 207 and financial services 208. Library service 208*c* may store objects in database 209*c* in any suitable form. In an exemplary embodiment, objects are stored by library service 208*c* in a suitable standardized data format, such as XML for example. Library service 208*c* may contain pre-configured advice text which complies with any relevant legal requirements, so that advisors need not create new, legally compliant text for each consumer. Additionally, library service 208*c* may suitably store static calculation tables used by financial simulators, such as simulator service 208*e*, in communication with the system 200.

In an exemplary embodiment, library service 208*c* stores data in the form of global static objects and snippets. Global static objects may be used by financial advice applications to perform analyses and calculations. An exemplary global static object might take the following form: "federal-single-filing-status-tax-table". Snippets are chunks of named text and/or graphics which are used in providing financial advice to system users, such as consumers. Snippets may comply with any relevant legal requirements and, therefore, may not be subject to ad hoc editing, by application developers or financial advisors for example, once stored in the library service 208*c*. Each snippet may have one or more of the following characteristics: (1) association with a logical identifier; (2) language dependency (permitting internationalization); (3) the ability to contain substitution parameters which may be resolved prior to insertion of the snippet into a formatted document produced by the system 200; (4) the capacity for storage as XHTML; (5) the capacity for "meta" characteristics which allow association with a variety of contexts; and/or (6) the ability to be strictly content based without containing style information, such as color and fonts for example.

An exemplary repository service 208*d* stores and retrieves non-static objects, such as economic group data for example, to and from database 209*d*. For example, repository service 208*d* may be used by client systems 205 and 207 and/or another financial service 208 to store and/or retrieve data corresponding to an economic group object. Objects in repository service 208*d* may be stored in database 209*d* in any suitable form. In an exemplary embodiment, objects in repository service 208*d* are stored in database 209*d* in a suitable standardized data format, such as XML. In another exemplary embodiment, repository service 208*d* is capable of converting data to and from particular data formats, such as conversions between object-oriented formats and XML formats. Additionally, repository 208*d* may be used to archive data and documents for SEC production requirements.

In an exemplary embodiment, the library service 208c and the repository service 208d use a document database framework to provide persistent object/document facilities for the system 200. The framework also may provide a suitable interface and implementation for storing/retrieving suitable data to/from databases 209c and 209d. The databases 209c and 209d may be any suitable type of database application, such as a directory services application, an object-oriented database, a relational database, and/or the like. In an exemplary embodiment, databases 209c and 209d are relational database management systems (DBMS).

An exemplary simulator service 208e uses any suitable programming or scripting language, as described above, to receive data pertaining to a particular economic group and to simulate financial transactions and events that affect the economic group's financial situation over the course of the planning period, which may be any suitable period, such as a 30-40 year period for example. In an exemplary embodiment, the simulator service 208e may use SmallTalk or Java. Relevant events, such as income, expenses, asset growth, inflation, retirement, death of a member of the economic group, and/or the like, can be simulated by simulator service 208e. For a complete discussion of an exemplary financial simulator, see U.S. Utility patent application Ser. No. 09/141,013 entitled "Computer-implemented Program For Financial Planning and Advice System" by inventor William J. Moran.

An exemplary asset allocation service 208f provides a model asset mix for a given set of personal/financial data or characteristics associated with an economic group.

An exemplary business graphics service 208g suitably receives data defining a particular business graphics layout and produces a suitable binary image of that data. In an exemplary embodiment, business graphics service 208g receives the data in a suitable standardized data format, such as XML for example. In another exemplary embodiment, business graphics service 208g produces a binary image in a suitable format, which may include, but is not limited to, any of the following: HTML, GIF, PDF, JPEG, and/or the like.

An exemplary roadmap service 208h is an application which provides financial planning and advice to users, such as consumers. In an exemplary embodiment, roadmap service 208h is an Internet-based application which utilizes other financial services 208 to provide consumers with an automated means for acquiring comprehensive, integrated financial planning without requiring the services of a financial advisor or other similar professional person. A user of the roadmap service 208h provides the roadmap service 208h with economic group data and/or other information regarding the economic group's current financial condition as well as plans which may affect the economic group's financial future. The roadmap service 208h analyzes this information as appropriate by applying a suitable financial planning methodology. The results of this analysis provide the user with insight into the general financial health of the economic group identified by the user. In performing the analysis, the roadmap service 208h may utilize various functionalities. For example, the repository service 208d may be used by roadmap service 208h to store user-supplied data; the library service 208c may provide data, such as suitable look-up tables, to the roadmap service 208h; and the formatting service 208b may be used to prepare results that are displayed to the user through a suitable user-interface.

The user-interface of the roadmap service 208h may be any suitable user-interface. In an exemplary embodiment, the user-interface is a JavaScript. In another exemplary embodiment, the user-interface resides on a suitable Web server 201 and is hosted by a suitable Web server software application 203, such as Microsoft's IIS Web server software. In operation, the user-interface suitably receives data from a user and transmits requests to the ASM 204 to perform various tasks. The ASM 204 suitably distributes the requests to the appropriate financial service 208 and then returns the results to the roadmap service 208h. In an exemplary embodiment, data may be formatted in a suitable standardized data format, such as XML, as the data is transmitted between the user-interface, the ASM 204, and the various financial services 208.

The domain model of the roadmap service 208h suitably receives, validates, and maintains user-supplied data; analyzes that data; and generates results that describe and explain the analysis. In an exemplary embodiment, the user-interface of the roadmap service 208h suitably provides the raw data, as received from the user, requests that the domain model perform suitable functions, coordinates the actions of the various financial services 208, and then suitably displays the result(s) to the user. In an exemplary embodiment, the Web server 201 coordinates the roadmap service 208h. The Web server 201 suitably communicates with the domain model, transmits results to the formatting service 208b, and generates suitable displays for the user. Thus, in this embodiment, the Web server 201 may be the client of all of the public functions offered by the domain model. In an exemplary embodiment, the domain model of the roadmap service 208h suitably includes various objects 211h, such as a Factory object, an economic group object, a financial position object, a financial analysis object, a financial areas object, and a goals object, for example.

In an exemplary embodiment, the Factory is the "well-known" object in the domain model. When a user accesses the roadmap service 208h for the first time, the Web server 201 communicates with the Factory to create a suitable economic group for the user. If the user already has created and saved data, the Web server 201 communicates with the Factory to retrieve the economic group data from the repository database 209d. Domain objects may be created by the Factory. For example, when an economic group seeks to add a new person to the group, the economic group transmits a suitable request to the Factory to create a Person object. The economic group then suitably adds the Person object to the economic group. In an exemplary embodiment, references to major domain objects may be made to a Java interface representation of the object, and the interfaces may be tied to concrete classes in the Factory.

In an exemplary embodiment, the economic group object is the center of the domain object and is responsible for manipulating the goals of the economic group. User demographics and preference data may be known through embedded references to, for example, the head of household (e.g., client 1) and/or the spouse (e.g., client 2). References also may be made to the financial position object and the financial analysis object. The economic group also contains information regarding the user's preferred allocation of assets and income towards the fulfillment of each identified goal.

In an exemplary embodiment, the financial position object contains information concerning the assets, liabilities, incomes, and expenses of the members of the economic group. Manipulation of and simple calculations involving these objects, such as total expenses and total income for example, may be accomplished through the financial position object. It should be noted that the equity evaluator service 208i, described in greater detail below, may share the financial position object with the roadmap service 208h. This preferably adds information regarding an investor profile object and a portfolio object to the financial position object.

Preferably, the investor profile object and the portfolio object are used by the equity evaluator service 208*i*.

In an exemplary embodiment, the financial analysis object performs calculations that relate to the economic group as a whole and creates objects that contain the results of those calculations. The financial analysis object also maintains the various financial area objects and suitably requests appropriate calculations and results from the financial areas. Financial analysis then suitably packages the results and provides them to the appropriate requester of those results. For example, financial analysis may provide a collection of status reports for all of the financial areas to a requester of such reports.

In an exemplary embodiment, one financial area object exists for each of the six areas of financial planning, namely, financial position planning, tax planning, protection planning, estate planning, retirement planning, and investment planning. Each of the financial areas performs suitable calculations and produces results pertaining to the financial area. For example, the financial position area may generate an income and expense report which discloses incomes and expenses, while the retirement planning area may create a retirement income projection report. A financial area may forward a request to a goal for fulfillment. The protection area, for example, may request income projection reports from protection goals and then transmit the generated reports to a suitable requester of the reports. Results are suitably generated and formatted based upon the parameters of the particular financial area and are not tailored to a particular user interface. Additionally, each financial area may have a status, which may be suitably represented on the user interface. Financial areas may be conduits for user interface requests for textual information. For example, requests for observations, strategies, and/or other types of text are preferably made from the user interface to a specific financial area. The financial area then forwards the request to the Financial Scan Oracle and sends the results back to the user-interface.

In an exemplary embodiment, the goals object preferably contains information pertaining to financial events that either might or will occur in the economic group's future. Exemplary categories of goals may include education, wealth accumulation, retirement, estate planning, tax planning, survivorship, disability, long-term care, and/or the like. Goals preferably contain fundamental information relating to the economic group, such as information defined by answers to "who, what, where, when, and how" queries relating to the economic group and the particular goal. Goals may contain information regarding whether the goal is achievable or not. Goals also may generate a suitable status, indicating whether the goal is being or has been accomplished, as well as suitable reports which present information associated with the generated status. Goals which do not contain this information may suitably have the information determined by a related financial area.

Figure 8:
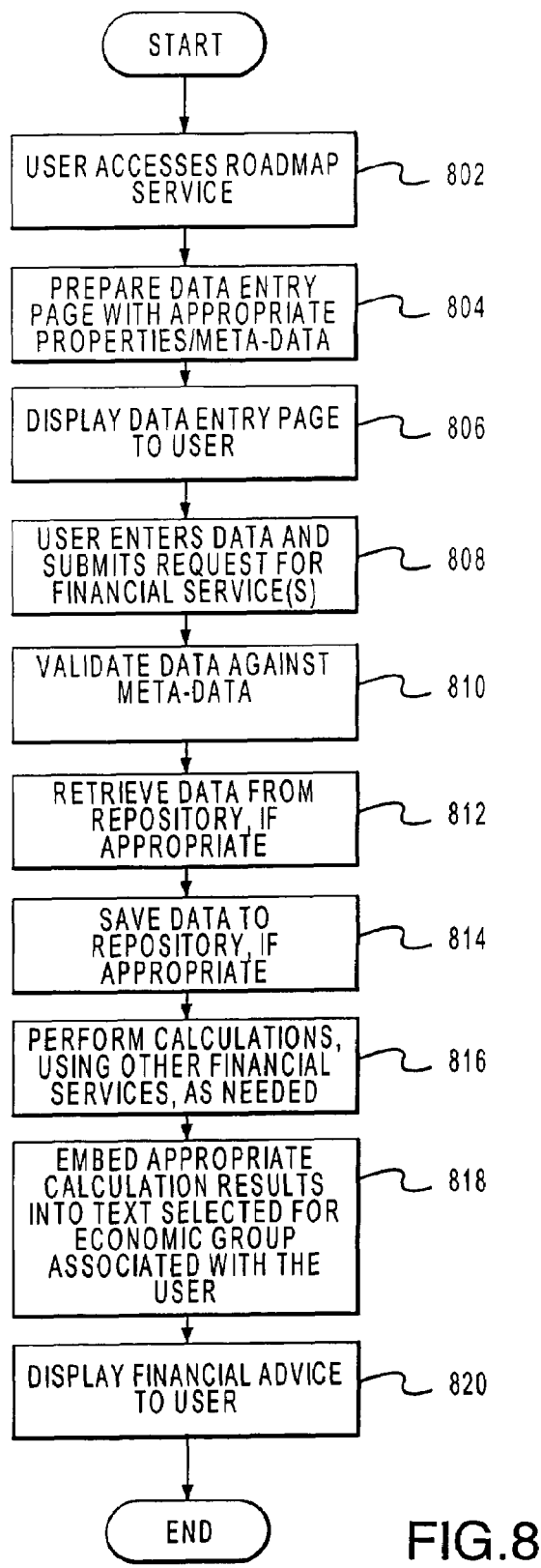
FIG. 8 is a schematic block diagram of the process flow for an exemplary roadmap service in accordance with the present invention.

FIG. 8 represents the process flow for an exemplary roadmap service 208*h*. In this embodiment, the user accesses the roadmap service (step 802) and, as a user provides data to the roadmap service via the user interface, the user interface preferably transmits the data to the domain model. As the user interface logic suitably prepares a data entry page for presentation to the user, the user interface preferably also transmits a request to the domain model for a collection of properties that are related to the data which the user is expected to provide (step 804). These properties suitably provide meta-data, such as minimum and maximum values, lengths, defaults, and/or the like, about data used by the domain model. In various embodiments, different types of properties may exist for different kinds of data. For example, boolean, string, keyword, integer, dollar, and percentage properties may be defined as appropriate. The meta-data contained by the properties is static, that is, the meta-data corresponds to all instances of a particular type of data. For example, a data entry field for allocating assets to a goal might be associated with a property which limits the maximum allocation to $1,000,000. Even though a particular user might have only $500 available for the allocation, the property only recognizes the $1,000,000 maximum allocation limitation. Additional domain edits may exist to recognize an individual user's maximum allocation, such as the $500 maximum in the above example. In an exemplary embodiment, properties are sent to the user interface through suitable property maps. Preferably, the property maps suitably permit the user interface to perform meta-data validations of the data entries by employing the same validation rules used by the domain model. Consistency in the applicable validation rules preferably assists the user interface in recognizing data entry errors before they are transmitted to the roadmap service.

Once the data entry page has been presented to the user (step 806), the consumer may suitably enter the data and submit request(s) for financial service(s) (step 808). The user interface logic may then suitably validate the data against the meta-data (step 810). Error messages are suitably provided to the user in the case of any discrepancies. If the data is validated, the user interface logic suitably prepares the data as an 'attribute' object. Attribute objects are collections of data which may be updated or retrieved as a group and which offer a means for 'check-pointing' during data updates. Attribute objects may be received, applied to the domain model, validated, and then accepted or deleted, all as a group. When the domain model suitably receives the attribute object, the domain model backs up existing domain data related to the data in the attribute object. The domain model then suitably updates itself with the attribute data and validates itself as a whole. If validation errors are found, the domain model can be restored from the backup, and a suitable error message may be sent to the user interface and displayed to the user.

In an exemplary embodiment, the domain model is suitably provided with user-supplied data by the Web server 201. The Web server 201 may transmit this data to the domain model at any suitable time, such as when the user has exited a data entry page for example. The Web server 201 launches a method set to a domain object and transmits attributes that contain the new data. These methods may create and execute implementers of the Update-Domain-Model-Command interface. This interface may use composite and command patterns to apply the updates to the domain model. Data is validated for correctness before being added to the domain model. During validation, the user interface may request that the domain data be updated by creating an attribute object and transmitting a message to update the domain model using the data in the attribute object. When the domain object receives the attribute object, the domain model may copy the existing data as backup attribute objects. The new data then is placed in the domain model. Next, properties-associated edits are completed. Non-properties-associated edits (such as the $500 maximum individual allocation described above) are then completed. If any errors are detected, the new data is replaced with the data in the backup files, and suitable error messages are transmitted to the user interface and displayed for the user.

When an established user logs into the system, the roadmap service 208*h* may retrieve and use the data that was saved during previous user sessions (step 812 of FIG. 8). The user interface suitably queries the domain model, via the Factory, to retrieve the appropriate data. The domain model identifies the user and requests that the repository service 208*d* search the database 209*d* for an economic group associated with the user. If the repository service 208*d* locates an appropriate economic group, the repository service 208*d* transmits the data to the roadmap service 208*h* and that data is used for the remainder of the user's current session. If a suitable economic group is not located by the repository service 208*d*, a suitable error message is transmitted to the user interface, and this error message may serve as a signal for the user interface to direct the user through a 'new user' path.

At various points during a user session, the roadmap service 208*h* may offer the user the option of saving the data associated with the session (step 814 of FIG. 8). If the user has never saved data before, the user may be identified as a "super-user", which is a generic user ID that preferably is assigned to all new users. If the user interface recognizes the user as a super-user, the user interface may retrieve and display a data entry page that permits the user to select a suitable identifier, such as a user ID. The identifier may include any suitable number, password, pass phrase, any combination of these, and/or the like. After the user has selected an identifier, the user interface logs the user into the system using their newly created identifier. The user interface then sends a 'save' request to the economic group. The economic group may verify that the user is logged into the system 200 using a suitable identifier. If the identifier cannot be verified, an error message is transmitted and displayed to the user. If the identifier is verified, the economic group transmits a request to the repository service 208*d* to save the economic group data, and the repository service 208*d* suitably saves the data to database 209*d*. In an exemplary embodiment, the repository service 208*d* translates the economic group data to a suitable standardized data format, such as XML, and then saves the formatted data to database 209*d*.

In an exemplary embodiment, the user identifier and a 'scenario' ID are used as keys for saving and retrieving data. The scenario ID identifies the financial service 208 which is attempting to save or retrieve data. In an exemplary embodiment, only one economic group can be saved for each unique user ID/scenario ID combination. An option set in the database 209*d* used by the repository service 208*d* can enforce this restriction. An error message may be returned if an attempt is made to save an economic group when the user ID/scenario ID combination has already been used.

In an exemplary embodiment, the repository service 208*d* determines whether data is to be updated or saved. When an economic group is retrieved, the repository service 208*d* assigns an identifier to the economic group and identifies that economic group as 'checked out'. When a financial service 208, such as the roadmap service 208*h*, requests that the repository service 208*d* save an economic group, the repository service 208*d* determines whether the economic group has been checked out. If the economic group has been checked out, an 'update' is completed. If it was not checked out, a 'save' is completed.

In an exemplary embodiment, economic group data saved under different scenarios are maintained independently. In this case, data may not be shared between the roadmap service 208*h* and the equity evaluator service 208*i*. In this embodiment, a user will enter redundant data if the user accesses both of these financial services during a single session. However, the economic group may contain data and references to the other user-data holding objects in the data model. As stated previously, in an exemplary embodiment, when economic group data is saved, the repository service 208*d* may translate the data to a standardized data format, such as an XML representation. When the economic group is retrieved, suitable objects then are created from the standardized data format. In an exemplary embodiment, data that is to be persisted has a standardized data format, otherwise it does not persist.

In an exemplary embodiment, after the user has entered appropriate data, calculations are performed using the data (step 816 of FIG. 8), which calculations may indicate the economic group's financial status, at least with respect to each of the areas of financial planning accounted for by the calculations. The roadmap service's calculations may be implemented in any suitable manner. In an exemplary embodiment, the calculations are a Java implementation of relevant mathematical formulas. The calculations may be contained in various objects, such as a financial analysis object, which is preferably an aggregation of all of the financial areas; a financial areas object, which may include a financial area corresponding to each of the six areas of financial planning; a goals object; a financial position object; and/or the like.

In an exemplary embodiment, the financial analysis object contains calculations that apply to all of the financial areas, such as a status report containing the status of each of the financial areas.

The financial areas objects may each contain calculations that pertain to the particular financial area. Optionally, a financial area may defer the calculations to goals and then transmit the results of the goal's calculations. For example, in the protection area, when survivor information is requested, the protection area queries each survivor goal for relevant information, aggregates the information, and then returns the aggregation. A financial area may also contain the relevant calculations. For example, the retirement planning area may be defined such that the calculations for retirement are based upon a combination of all of the retirement goals, but the goals themselves are not responsible for the calculations. The retirement area may complete the calculations by querying the retirement goals for particular data. However, goals may also contain calculations, such as the protection goals noted above. Additionally, some goals, such as retirement goals for example, may be defined such that the goal stores data which a corresponding financial area may use to do particular calculations.

In an exemplary embodiment, calculations may require a determination of the present value, future value, or payment amount of some number. Some of these may use either annual or monthly compounding. For example, if a calculation uses inflation expectations to determine a particular number or amount, annual compounding is employed. If the rate of return is used to perform the calculation, monthly compounding is used. A financial calculator object contains the logic needed for any appropriate calculations.

In some cases, the calculations used by the roadmap service 208*h* are dependent upon the results of other calculations and may be highly CPU intensive. For example, the calculations for determining the status of an economic group member's retirement may involve as many as 25 methods, each of which is used once for each of the years between the initial or current year and the year marking the end of the economic group member's life expectancy. Additionally, each year after the initial year likely requires the results generated for the previous year, and some calculations may be used by other goals as well as by any of the financial areas. In the light of the volume of calculations performed by the roadmap service 208*h*, calculation results may be cached.

In an exemplary embodiment, a cache is suitably designed for each financial area or goal that may benefit from the use of the cache. The cache may include a suitable array, such as a two-dimensional array. The keys to the array may be a number assigned to both the method whose value is being cached and the simulation year for which the calculation is to be completed. When a requester asks for a calculation result, the corresponding method may search its cache. If the value has been calculated previously and stored in the cache, the cached value is suitably returned. If there is no cached value, the value is suitably calculated, stored in the cache, and then returned to the requester. Cached objects may be held by the object whose calculations are being cached. For example, the retirement planning area may have a field containing a retirement planning area cache. Over time, the caches may need to be reinitialized. An update or change in any data (such as risk tolerance, an asset value, a goal assumption, and/or the like) may suitably accomplish the reinitialization. The scenario 'changed event' then can be suitably broadcast to listeners for the event, using the associated scenario 'changed event' multicaster. Objects that contain cached objects may be registered with the multicaster and designated as listeners for suitable types of events.

In an exemplary embodiment, the roadmap service 208h may select text, such as strategies, financial advice, and the like, which applies to a particular economic group, and may embed values from the economic group's situation into the text (step 818 of FIG. 8). Numerical values in the text are suitably provided by calculations in the domain model, and Web server 201 requests for text can come through the domain model and be re-routed to a suitable text oracle. The text oracle preferably selects the text and provides values associated with the domain calculation results. Appropriate financial advice data, which may include appropriate financial advice, strategies, graphs, charts, tables, and/or the like, may then be suitably displayed to the user (step 820 of FIG. 8).

As represented in steps 812, 814, and 816 of FIG. 8, the roadmap service 208h may interact with other financial services 208 as needed. The roadmap service 208h may communicate with other financial services 208 either directly, through system bus 211, or via the ASM 202. The roadmap service 208h suitably communicates with other financial services 208 to access the different functionalities provided by the other financial services 208. For example, the formatting service 208b may be responsible for translating data from one presentation format to another, such as changing the format of a calculation result so that it might appear in a particular manner on a Web page or in a printed report. Although the roadmap service 208h preferably does not interact directly with the formatting service 208b, the formatting service 208b may format substantially all of the roadmap service's results. In one embodiment, when a user who accesses the system from the Web seeks to display particular financial advice or results, for example, the Web server 201 asks the domain model for the report that contains those results. The Web server 201 then suitably transmits those results to the formatting service 208b. The formatting service 208b then uses the data contained in the report to create graphs, tables, and other suitable presentation formats that are transmitted to the Web server 201, which then suitably transmits the results to the user's browser for display to the user. In an exemplary embodiment, the formatting service 208b accomplishes this by searching for certain tags, such as XML tags for example, within the data file which contains the requested information. If the formatting service 208b cannot find the appropriate tags in the data file, the formatting service 208b cannot properly format the data file. Changes to the tags embedded within the data file may be coordinated with the formatting service 208b to ensure the changes are compatible with the functionality of the formatting service 208b.

The library service 208c is suitably used by the roadmap service 208h to maintain 'static' data, such as lookup tables and other suitable table-type data. These tables may contain any suitable data, such as tax information, life expectancy service 208c is initialized, and the data may be shared by all users of the library service 208c.

The repository service 208d is suitably used by the roadmap service 208h to store and retrieve data entered by the user through the roadmap service 208h.

The equity evaluator service 208i suitably shares at least a few domain model objects with the roadmap service 208h. As stated previously, both of these financial services may use the economic group object and the financial position object and may share appropriate data saving and retrieving functions.

An exemplary equity evaluator service 208i assists users in performing high-level evaluations of their stock holdings. Users of the equity evaluator service 208i suitably provide the service 208i with information relating to the user's stock holdings and investment profile. The equity evaluator service 208i then suitably analyzes the information in conjunction with any available stock performance data, such as Standard & Poors® (S&P) stock performance data and/or any available American Express® Financial Advisors (AEFA) rankings, for example. The results of the analysis are then suitably presented to the user.

In one embodiment, the equity evaluator service 208i is an Internet-based application which utilizes other financial services 208. In an exemplary embodiment, database 209i may be used to store objects and other data, such as stock data, which may be associated with a user or plurality of users of equity evaluator service 208i. The database 209i may be any suitable database, such as an object oriented database, a relational database, and/or the like. Additionally, the repository service 208d may be used to store/retrieve persisting data via the equity evaluator service 208i. The library service 208c may be used by the equity evaluator service 208i for suitable snippets and global static objects. The formatting service 208b may be used to format results (tables, graphs, text, and/or the like) for display to the user via a suitable user interface.

In an exemplary embodiment, the equity evaluator service 208i is the back-end service which is responsible for gathering portfolio and investor profile information, validating data, and evaluating the information entered by the user to provide financial advice to the user. In this regard, the equity evaluator service 208i performs a portfolio evaluation once the user enters suitable stock holdings information (such as stock ticker identifier, number of shares, and/or the like) and enters an investor profile, including, for example, investment objectives, risk tolerance, number of years before the invested funds will be used, and/or the like. In an exemplary embodiment, the portfolio evaluation is completed on at least two levels. First, each stock is evaluated on an individual basis. Second, the overall portfolio is evaluated as a "team" of stocks which work together relative to the investor's profile. In another exemplary embodiment, the evaluation may include a consideration of the user's collection of stock holdings (e.g., Stock Holding object); suitable investor profile information provided by the user (e.g., Investor Profile object); equity evaluation rules and snippet text; suitable stock performance data from the stock market, such as the S&P database; and/or any AEFA ranking information.

In another exemplary embodiment, the stock market performance data may be received on a periodic basis, such as nightly from Standard and Poors® for example. The stock data, such as price, rankings, and/or the like, preferably are current as of the close of the market the previous day. The stock database may be read periodically, such as every two hours, every four hours, every six hours, and/or the like, and the data in the stock market object is updated accordingly.

In another exemplary embodiment, the formatting service 208b is not used directly by the equity evaluator service 208i. However, results provided by the equity evaluator service 208i may be transmitted to the formatting service 208b and subsequently displayed to the user in a suitable format.

In another exemplary embodiment, as with the roadmap service 208h, the equity evaluator service 208i suitably includes various objects 211i, such as a Factory object, an economic group object, a stock holding object, an investor profile object, a stock performance object, a portfolio object, a portfolio analysis object, a stock market object, and/or a stock portfolio oracle object, for example. The Factory is the "well-known" object in the equity evaluator service's domain model. Users of the equity evaluator service 208i are suitably associated with an economic group. As described above with reference to the roadmap service 208h, if the user is not associated with an economic group, a suitable economic group is created. If the user is affiliated with an economic group, the existing economic group data is suitably retrieved from database 209d before the equity evaluator service 208i proceeds.

In an exemplary embodiment, as with the roadmap service 208h, the economic group may be a central object of the equity evaluator service's domain model. The economic group object preferably provides suitable "save" behavior, which allows the user to save relevant data. Saving the economic group may result in saving not only the user's economic group but also saving the user's financial position, investor profile, and the portfolio.

In an exemplary embodiment, the portfolio object is a an aspect of the portfolio evaluation process. The portfolio suitably includes a collection of stock holding objects. In addition, the portfolio object may perform the portfolio analysis and manage requests for results of any analyses performed. The portfolio analysis results may include information and advice on portfolio analysis, portfolio investment principles, diversification, general observations, and/or the like. The portfolio object may have a reference to the portfolio analysis object, which may hold the results of the analysis. The portfolio may be the entry point for related advice text originating from the stock portfolio oracle, a well-known object which coordinates the presentation of a simplified interface for users. The portfolio may suitably enable calculation of the portfolio market value, portfolio beta, portfolio dividend yield, the portfolio price-earnings (PE) ratio, and/or the like. Additionally, the portfolio may validate the portfolio periodically by verifying the stock holdings and matching each individual stock holding with performance data in the database.

In an exemplary embodiment, the portfolio analysis object is the preferred repository for the results of a portfolio analysis. When results are calculated by the portfolio object, the results are suitably cached in portfolio analysis. If a portfolio analysis is requested from the portfolio, the portfolio first determines whether the results already have been calculated and cached. If the results have been cached, the results are not recalculated. Anytime new stocks are entered, stocks are updated, and/or the investor profile is altered in some way, analysis results may be recalculated and reset. In addition, if the economic group is retrieved, the results may be recalculated, since portfolio analysis results preferably are neither stored nor retrieved with the economic group.

In an exemplary embodiment, a stock holding object suitably represents a particular stock that the user "owns", either actually or hypothetically. The stock holding object may contain information pertaining to the stock ticker identifier and/or the number of shares owned. The stock holding may be used during calculations to represent the stocks associated with a particular user. The stock holding object may also provide an entry into the stock market object to retrieve stock performance data.

In an exemplary embodiment, the stock performance object suitably represents the stock performance attributes of a particular stock ticker in the stock market. This object may be created during the stock market stock data creation process and represents rows of data from the stock market stock performance database.

In an exemplary embodiment, the stock market object suitably holds stock market related information, such as the current stock data object (which may be a collection of current stock performance objects for the stocks monitored by the S&P 500 and/or the AEFA) and the current S&P 500 dividend yield object (preferably the dividend yield for the overall stock market S&P 500). The Equity evaluator service 208i suitably utilizes this performance data during the portfolio analysis.

In an exemplary embodiment, the stock portfolio oracle object suitably provides an entry into the AUS 202 and implements the rules for presenting the user with suitable financial advice information, such as the text used to offer financial advice in the form of observations, recommendations, and/or strategies for example.

Figure 3:
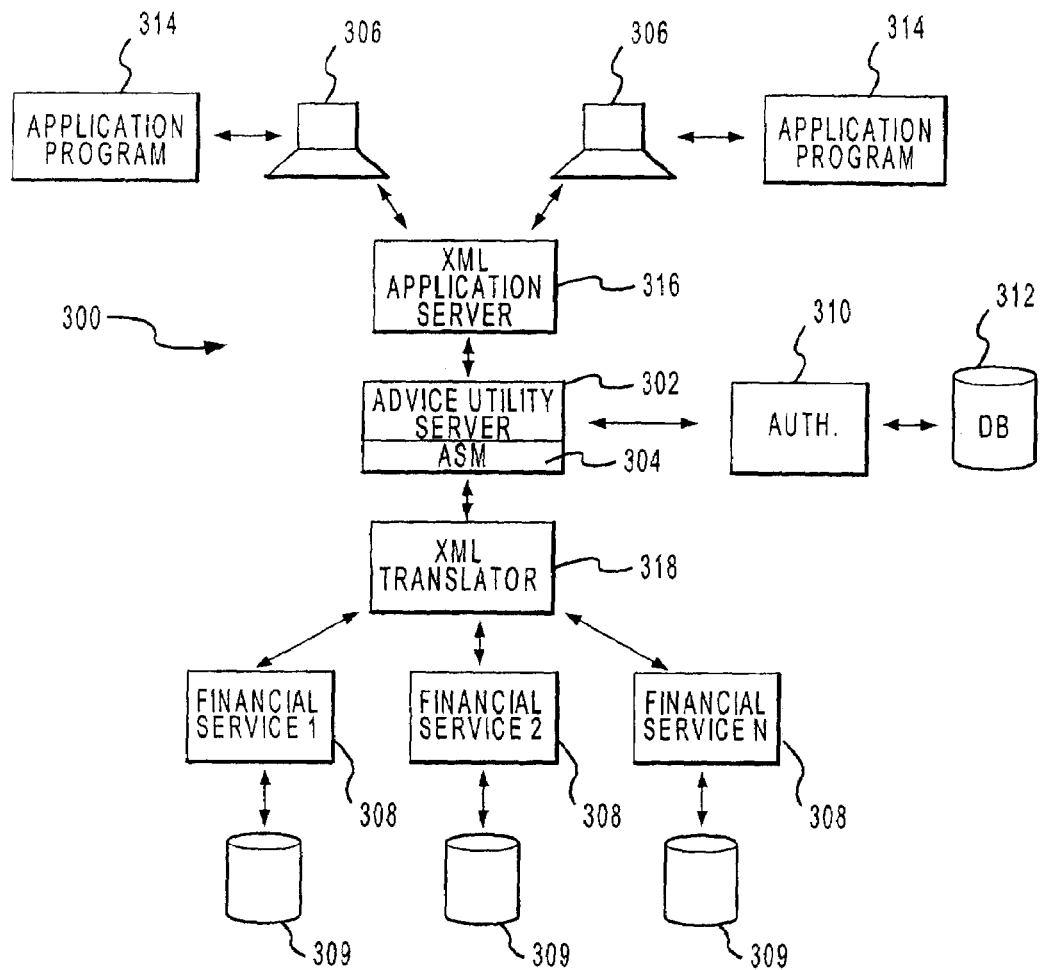
FIG. 3 is a schematic block diagram illustrating another exemplary system for creating financial advice applications in accordance with various aspects of the present invention.

In accordance with another aspect of the present invention, FIG. 3 is a diagram illustrating an exemplary system 300 which employs a data migration mechanism for standardizing the format of data transmissions among the various components used by the system for creating financial advice applications. The data migration mechanism utilized in the exemplary system 300 can include a conversion server, such as XML application server 316, which enables client systems 306 to send suitably standardized data to the AUS 302, and a translator, such as XML translator 318, which enables financial services 308 to send suitably standardized data to the AUS 302 and among the financial services 308.

As will be appreciated, a suitable data migration mechanism may utilize any suitable data format to standardize the format of data transmitted and received by the various components of the system 300, which components may employ a plurality of data formats. In an exemplary embodiment, XML is employed to facilitate communication between AUS 302 and client systems 306, though it will be recognized that any suitable data formatting language may be used by the system of the present invention. In the case of exemplary conversion server 316, data transmitted by client systems 306 is suitably converted, if needed, to XML. Likewise, responses from the AUS 302 to client systems 306 are also suitably converted by conversion server 316, if needed, to XML. Since XML representations are independent of programming or scripting language implementation and permit data to be altered by XML independently of the software being used, XML offers a good model for data migration. The system 300 therefore suitably allows any type of client system 306 to communicate with the AUS 302 and to interact easily with the system 300.

In an exemplary embodiment, the translator 318 is the subsystem responsible for retrieving or reading objects from the financial services 308 and translating those objects into a suitable standardized data format, such as XML for example. The process of translating objects into XML may be referred to as "externalization" and, conversely, reading in XML and translating into suitable objects may be referred to as "internalization". In an exemplary embodiment, a translator 318 includes a hierarchy of translators which suitably correspond to the many types of objects that that may require translation. The system 300 may implement the translation of any suitable programming or scripting language, such as Java, Smalltalk, and/or the like.

In accordance with this aspect of the invention, the exemplary system 300 suitably combines the functionality of a plurality of financial services 308 into new applications for delivering financial advice. The system 300 preferably utilizes XML, which complements HTML and is based upon Standardized Generalized Markup Language (SGML). XML can be used with a wide variety of international languages and allows data on an HTML page to be described by the type of information that it represents. Preferably, XML tags suitably indicate data representations and have an almost unlimited potential, as users of the XML format may suitably define unique sets of tags.

Figure 4:
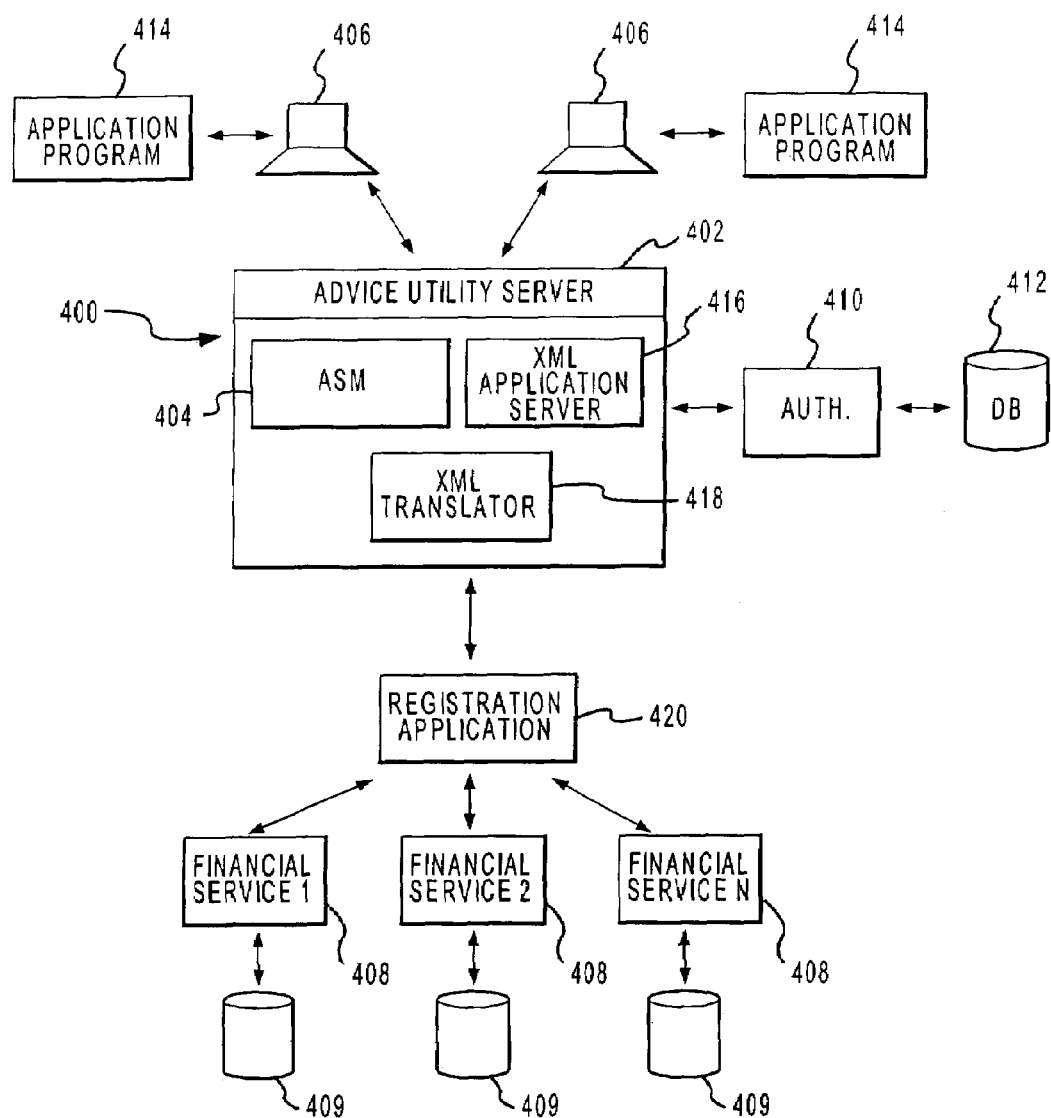
FIG. 4 is a schematic block diagram illustrating yet another exemplary system for creating financial advice applications in accordance with various aspects of the present invention.

It should be understood that while FIG. 3 illustrates that the conversion server 316 may communicate directly with the AUS 302 through a suitable communication link, the conversion server 316 may be integrated with the AUS 302, as illustrated in the exemplary system 400 of FIG. 4. Likewise, though translator 318 may communicate directly with the AUS 302 through a suitable communication link, the translator 318 may be integrated with the AUS 302, as further illustrated in the exemplary system 400 of FIG. 4.

Moreover, as seen in FIG. 4, an exemplary system 400 may also include a registration application 420. In an exemplary embodiment, when a financial service 408 initializes, it transmits a suitable request to the registration application 420 to register the financial service 408 with the system 400. The registration application 420 suitably responds to the request by replying with an allocated TCP/IP port for use by the financial service 408 while the financial service 408 is actively participating in the system 400. When the financial service 408 shuts down, the financial service 408 suitably notifies the registration application 420, and the registration application 420 removes the particular financial service 408 from the list of available financial services 408.

Figure 5:
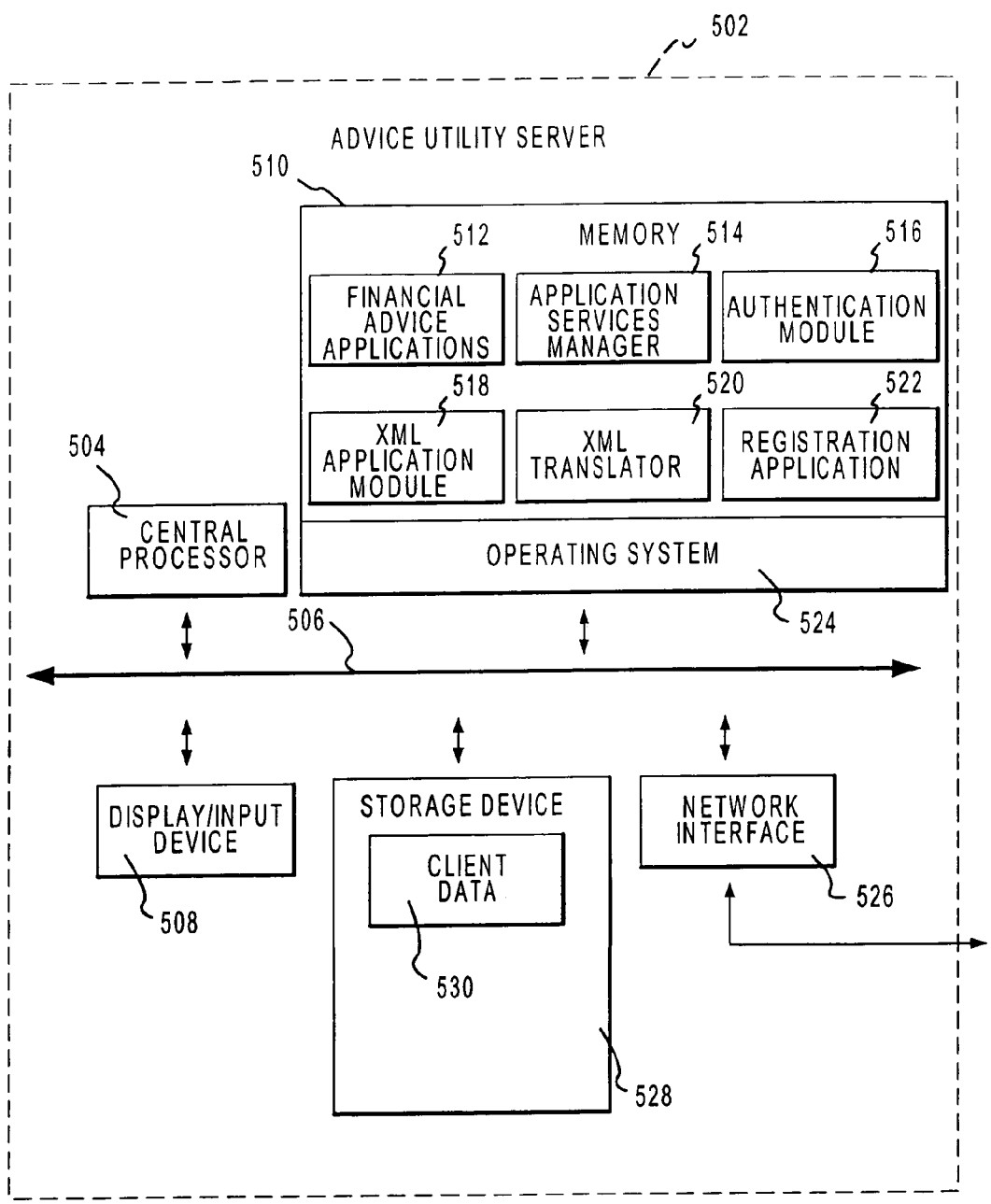
FIG. 5 is a schematic block diagram of an exemplary advice utility server in accordance with the present invention.

With reference to FIG. 5, an exemplary AUS 502 includes a central processor 504 in communication with other elements of the AUS 502 through a system interface or bus 506. A suitable display device/input device 508, such as a keyboard or pointing device in combination with a monitor, may be provided for receiving data from and outputting data to a user. A memory 510 associated with the AUS 502 suitably includes at least one financial advice application 512, an application services manager 514, an authentication module 516, an XML application module 518, an XML translator 520, and a registration application 522. The memory 510 may also include an operating system 524 which enables execution by central processor 504 of the various software applications residing at financial advice application 512, application services manager 514, authentication module 516, XML application module 518, XML translator 520, and registration application 522. Operating system 524 may be any suitable operating system, such as any version of Windows, MacOS, BeOS, Linux, Unix, and/or the like. A network interface 526 is suitably provided for interfacing with other elements of the systems for creating and using financial advice applications, such as the elements described above with reference to FIGS. 1-4. Lastly, a storage device 528, such as a hard disk drive for example, may contain files which are suitably accessed by financial advice application 512, application services manager 514, authentication module 516, XML application module 518, XML translator 520, and registration application 522.

In particular, client data 530 suitably includes information pertaining to users of the client systems who are authorized to interact with the AUS 502, which information is suitably used to perform authentication and/or authorization processes. As used within the context of FIG. 5, a "client" may be either a user of a client system used to create financial advice applications or a user of a client system used to access created financial advice applications. Accordingly, authentication of users of AUS 502 may be performed by the authentication module 516, which suitably accesses the data residing in storage device 528. It will be appreciated that the storage device 528 and, therefore, client data 530 may be co-located with the AUS 502, as illustrated in FIG. 5, or may be remotely located with respect to the AUS 502. If the storage device 528 is remotely located with respect to the AUS 502, communication between storage device 528 and AUS 502 may be accomplished by any suitable communication link, such as through a private Intranet or extranet for example.

Figure 6:
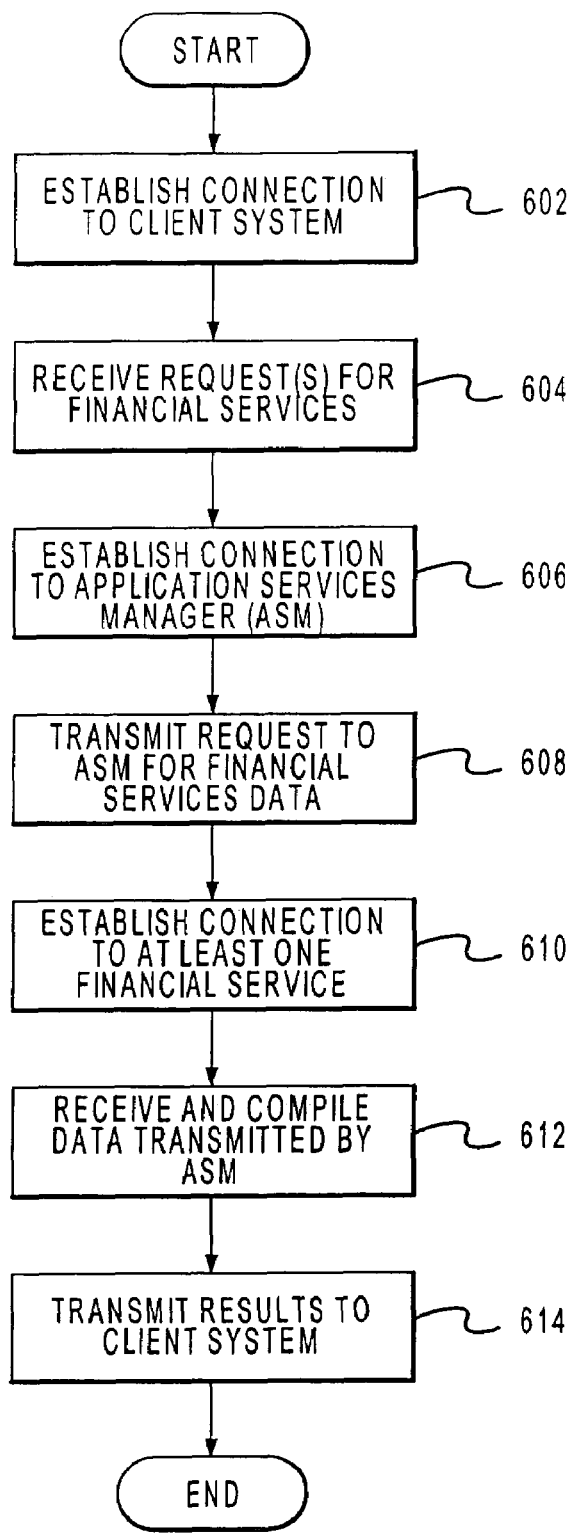
FIG. 6 is a flowchart representing an exemplary method of creating a financial advice application in accordance with the present invention.
Figure 7:
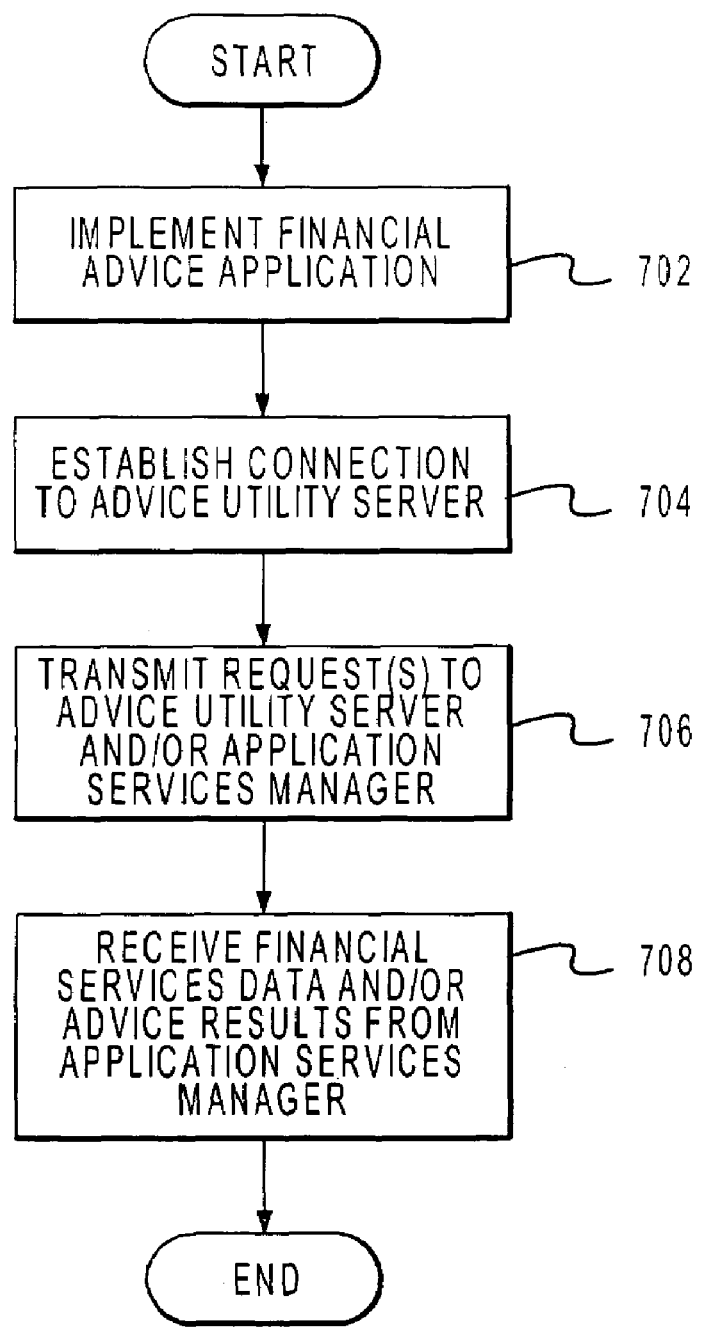
FIG. 7 is a flowchart representing an exemplary method of using a financial advice application created by the method of FIG. 6.

Referring next to FIGS. 6 and 7, the process flows depicted in these figures are exemplary embodiments of the invention only and are not intended to limit the scope of the invention as described above. FIG. 6 is a flow diagram representing an exemplary process for creating financial advice applications. In accordance with the present invention, an exemplary process executed by a suitable advice utility server may include any of the following: establishing a connection to a client system having an application program including at least one module, wherein each module of the application program corresponds to a financial services function (step 602); receiving a request from the application program for financial services data (step 604); establishing a connection to an application services manager such that data is capable of being transmitted between the application program and the application services manager (step 606); transmitting a request to the application services manager for financial services data (step 608); establishing a connection between the application services manager and at least one financial service such that data is capable of being transmitted between the application services manager and the at least one financial service (step 610); receiving and compiling the financial services data transmitted from the application services manager (step 612); and transmitting a result of compiling the financial services data to the application program (step 614).

In accordance with the present invention, a client system having a suitable application program implemented thereon can create financial advice applications through the AUS. As represented in FIG. 6 by step 602, the AUS establishes a suitable connection to a suitable client system. In an exemplary embodiment, the AUS is established and maintained by any suitable party, such as a financial institution, a financial planning and advice organization, and/or the like. As described above, the communications connection between the AUS and the client system can be established through any known means of communication. In an exemplary embodiment, after establishing the connection to the client system, the AUS may suitably communicate with an authentication server and/or an authentication database to authenticate a user of the application program implemented by the client system. Once the user of the client system has been suitably authenticated, the user may transmit suitable request(s) for financial services to the AUS. When the AUS receives the request(s) (step 604), the AUS suitably establishes a connection to the ASM (step 606). After establishing the connection with the ASM, the AUS transmits the request(s) for financial services to the ASM (step 608).

In one exemplary embodiment, the AUS may suitably format data transmitted between the application program on the client system and the AUS into a standardized data format before transmitting the request to the ASM. In this embodiment, the AUS may suitably convert data from one format to another format. For example, the AUS may suitably convert object-oriented data transmitted from a client system to XML and may also suitably convert XML to object-oriented data. The AUS may suitably convert data objects written in any suitable language, such as Java and SmallTalk, for example.

In another exemplary embodiment, the AUS may suitably retrieve data and other information stored in one or more suitable databases, such that the data and information may be suitably included in a financial advice application. In a further exemplary embodiment, the AUS may suitably script requests from the application program implemented on the client system such that a single request from a client system creates a financial advice application including data from a plurality of financial services.

Once the ASM receives the request(s) from the AUS, the ASM suitably establishes a connection to at least one financial service and/or database configured to fulfill the request (step 610). Suitable financial services may include at least one of a leased storage service, a formatting service, a library service, a repository service, a simulator service, an asset allocation service, a business graphics service, a roadmap service, an equity evaluation service, a calculator service, a data entry service, an information service, a conversion service, and a tracking service. In an exemplary embodiment, each financial service suitably communicates with a registration application which is configured to allocate a TCP/IP port for use by the financial service during a client session. The appropriate financial service(s) suitably processes the request, and then transmits suitable results to the ASM. In an exemplary embodiment, the financial service(s) may either process the request individually or, depending on the circumstances of the request(s), may suitably communicate with other financial services to process the request(s). Then, the ASM and/or the AUS receives and compiles the information and results from the appropriate financial services (step 612) and suitably forwards these results to the client system (step 614) for display to the user.

FIG. 7 is a flow diagram representing an exemplary process for using a financial advice application created by the process of FIG. 6. In accordance with the present invention, an exemplary process executed by a suitable client system may include any of the following: implementing a suitable financial advice application (step 702); establishing a connection to an advice utility server including an application services manager (step 704); transmitting at least one request to said application services manager for at least one financial service (step 706); and receiving financial services data and/or financial advice results from said application services manager (step 708). In an exemplary embodiment, implementing a financial advice application may include establishing a connection to a Web server or accessing a financial advice application on a desktop. In another exemplary embodiment, the data transmitted between the advice utility server and either a Web server or a desktop is in a standardized data format, such as XML for example.

It will be appreciated that any suitable security, authentication, encryption, and other similar interfaces are within the scope of the present invention. Additional information on computing and Internet languages can be found in, for example, "Internet—Standards and Protocols" by Dilip C. Naik, Microsoft Press, 1998.

It should be understood, however, that the detailed description and specific examples, while indicating exemplary embodiments of the present invention, are given for purposes of illustration only and not of limitation. Many changes and modifications within the scope of the instant invention may be made without departing from the spirit thereof, and the invention includes all such modifications. The corresponding structures, materials, acts, and equivalents of all elements in the claims below are intended to include any structure, material, or acts for performing the functions in combination with other claimed elements as specifically claimed. The scope of the invention should be determined by the appended claims and their legal equivalents, rather than by the examples given above. For example, the steps recited in any method claims may be executed in any order and are not limited to the order presented in the claims. Moreover, no element is required for the practice of the invention unless specifically described herein as "critical" or "essential".

What is claimed is:

1. A method of creating financial advice applications, comprising:

receiving, from a plurality of disparate providers, a plurality of distinct financial advice services, wherein each of said a plurality of distinct financial advice services comprises executable code;

receiving a request including financial data at a financial advice application, wherein said financial advice application is configured to use said financial data to provide financial planning and advice, wherein said financial data is related to financial need, preferred financial strategy and economic class of an entity;

evaluating said request to identify a subset of said plurality of distinct financial advice services based on said financial need, preferred financial strategy and economic class;

identifying said subset based on said financial need, preferred financial strategy and economic class;

compiling data requirements unique to said entity based on said financial need, said preferred financial strategy and said economic class, wherein said data requirements include format and value properties in accordance with said subset;

compiling a data entry page having fields for collecting information relating to said financial need, preferred financial strategy and economic class based on said data requirements, wherein said fields are populated by at least one of a client and a representative of said client via a client computer, to create fields populated with said information relating to said financial need, preferred financial strategy and economic class;

applying to said fields said format and said value properties as metadata to enforce data entry rules;

transmitting said financial data to said client computer in the form of a financial advice application, wherein said financial advice application is fully executable at said client computer;

scripting requests from said client computer such that a single request creates said financial advice application;

receiving a completed data entry page including field data based on said data requirements and said subset, wherein said field data is entered by said at least one of said client and said representative;

determining when said field data complies with said data entry rules;

formatting said field data into a format that is usable by each of said subset;

transmitting said field data to said subset, wherein said subset processes said field data to provide said financial planning and advice;

receiving said financial planning and advice from each of said subset;
formatting said financial planning and advice received from each of said subset to a standardized data format;
comparing said financial planning and advice to stored economic group data, and,
determining specific strategies for said financial planning and advice based upon said comparison of said stored economic group data.

2. The method of claim 1, wherein said financial advice application further includes a headless utility, a leased storage service, a formatting service, a library service, a repository service, a simulator service, an asset allocation service, a business graphics service, and an equity evaluation service.

3. The method of claim 1, wherein said standardized data format is XML.

4. The method of claim 1, further comprising formatting data transmitted between said plurality of distinct financial advice services in a standardized data format.

5. The method of claim 4, wherein said standardized data format is XML.

6. The method of claim 1, further comprising communicating with a registration application configured to allocate a TCP/IP port for use by said financial advice application during a client session.

7. A system for creating financial advice applications, comprising:
a client computer having an application program implemented thereon, wherein said application program comprises a module and said module corresponds to a financial advice service; and,
wherein said financial advice application is configured to:
receive, from a plurality of disparate providers, a plurality of distinct financial advice services, wherein each of said a plurality of distinct financial advice services comprises executable code;
evaluate a request to identify a subset of said plurality of distinct financial advice services based on financial need, preferred financial strategy and economic class of an entity;
identify said subset based on said financial need, preferred financial strategy and economic class;
compile data requirements unique to said entity including format and value properties based on a financial position and a lifetime goal, wherein said lifetime goal is related to at least one of:
education, wealth accumulation, retirement, estate planning, tax planning, survivorship, disability, and long-term;
compile a data entry page having fields for collecting information relating to said at least one of:
financial need, preferred financial strategy and economic class based on said data requirements, wherein said fields are populated by at least one of said client and a representative of said client via a client computer, to create fields populated with said information relating to said financial need, preferred financial strategy and economic class;
applying to said fields said format and said value properties as metadata to enforce data entry rules;
use data defined by said current financial position and said lifetime goal to provide financial planning and advice;
convert data transmissions between at least one of said client computer, said subset, and said financial advice application into a standardized data format;
receive data from said subset in order to create a financial advice application, wherein said financial advice application is configured to script requests from said client computer such that a single request creates said financial advice application;
transmit said financial advice application to said client computer, wherein said financial advice application is fully executable at said client computer;
receive a completed data entry page including field data based on said data requirements and said plurality of financial advice services, wherein said field data is entered by said at least one of said client and said representative;
determine when said field data complies with said data entry rules; and, transmit said field data to said, wherein said subset processes said field data to provide said financial planning and advice;
receive said financial planning and advice from each of said subset;
format said financial planning and advice received from each of said subset to a standardized data format;
compare said financial planning and advice to stored economic group data, and,
determine specific strategies for said financial planning and advice based upon said comparison of said stored economic group data.

8. The system of claim 7, wherein said standardized data format is XML.

9. The system of claim 7, further comprising a translator in communication with said financial advice application, wherein said translator is configured to translate data transmissions between said plurality of distinct financial advice services into a standardized data format.

10. The system of claim 9, wherein said standardized data format is XML.

11. The system of claim 7, further comprising a registration application in communication with said financial advice service, wherein said registration application is configured to allocate a TCP/IP port for use by said financial advice application during a client session.

12. The system of claim 7, wherein said financial advice application further includes at least one of a headless utility, a leased storage service, a formatting service, a library service, a repository service, a simulator service, an asset allocation service, a business graphics service, and an equity evaluation service.

13. The system of claim 7, wherein said financial advice application comprises an application services manager configured to communicate with said client computer and said financial advice service.

14. A computer-readable storage medium encoded with processing instructions stored thereon, wherein said processing instructions are configured to direct a computer to perform the steps of:
receiving, from a plurality of disparate providers, a plurality of distinct financial advice services, wherein each of said a plurality of distinct financial advice services comprises executable code;
receiving a request including financial data at a financial advice application, wherein said financial advice application is configured to use said financial data to provide financial planning and advice, wherein said financial data is related to financial need, preferred financial strategy and economic class of an entity;
evaluating said request to identify a subset of said plurality of distinct financial advice services based on said financial need, preferred financial strategy and economic class;

identifying said subset based on said at least one of: financial need, preferred financial strategy and economic class;

compiling data requirements unique to said entity based on said financial need, said preferred financial strategy and said economic class, wherein said data requirements include format and value properties in accordance with said subset;

compiling a data entry page having fields for collecting information relating to said financial need, preferred financial strategy and economic class based on said data requirements, wherein said fields are populated by at least one of said client and a representative of said client, to create fields populated with said information relating to said at least one of: financial need, preferred financial strategy and economic class;

applying to said fields said format and said value properties as metadata to enforce data entry rules;

transmitting said financial data to said client computer in the form of a financial advice application, wherein said financial advice application is fully executable at said client computer;

scripting requests from said client computer such that a single request creates said financial advice application;

receiving a completed data entry page including field data based on said data requirements and said subset, wherein said field data is entered by said at least one of said client and said representative via a client computer;

determining when said field data complies with said data entry rules;

formatting said field data into a format that is usable by each of said subset;

transmitting said field data to said subset, wherein said subset processes said field data to provide said financial planning and advice;

receiving said financial planning and advice from each of said subset;

formatting said financial planning and advice received from each of said subset to a standardized data format;

comparing said financial planning and advice to stored economic group data, and determining specific strategies for said financial planning and advice based upon said comparison of said stored economic group data.

15. The computer-readable storage medium of claim 14, wherein said financial advice application further includes at least one of a headless utility, a leased storage service, a formatting service, a library service, a repository service, a simulator service, an asset allocation service, a business graphics service, and an equity evaluation service.

16. The computer-readable storage medium of claim 14, further comprising processing instructions configured to direct a computer to perform the step of formatting data transmitted between said client computer and said financial advice application in a standardized data format.

17. The computer-readable storage medium of claim 16, wherein said standardized data format is XML.

18. The computer-readable storage medium of claim 14, further comprising processing instructions configured to direct a computer to perform the step of formatting data transmitted between said plurality of distinct financial advice services in a standardized data format.

19. The computer-readable storage medium of claim 18, wherein said standardized data format is XML.

20. The computer-readable storage medium of claim 14, further comprising processing instructions configured to direct a computer to perform the step of allocating a TCP/IP port for use by said financial advice application during a client session.

21. A device for creating financial advice applications, which device comprises:

a central processor;

a storage device in communication with said central processor;

and a memory connected to said central processor, wherein said memory includes an operating system for storing and executing a program which controls operation of said central processor;

wherein said central processor is operative with an advice utility server to:

receive, from a plurality of disparate providers, a plurality of distinct financial advice services, wherein each of said a plurality of distinct financial advice services comprises executable code;

evaluate a request to identify a subset of said plurality of distinct financial advice services based on financial need, preferred financial strategy and economic class of an entity;

identify said subset based on said financial need, preferred financial strategy and economic class;

compile data requirements unique to said entity including format and value properties based on a financial position and a lifetime goal, wherein said lifetime goal is related to at least one of:

education, wealth accumulation, retirement, estate planning, tax planning, survivorship, disability, and long-term;

compile a data entry page having fields for collecting information relating to said financial need, preferred financial strategy and economic class based on said data requirements, wherein said fields are populated by at least one of said client and a representative of said client via a client computer, to create fields populated with said information relating to said financial need, preferred financial strategy and economic class;

applying to said fields said format and said value properties as metadata to enforce data entry rules;

use data defined by said current financial position and said lifetime goal to provide financial planning and advice;

convert data transmissions between at least one of said client computer, said subset, and said financial advice application into a standardized data format;

receive data from said subset in order to create a financial advice application, wherein said financial advice application is configured to script requests from said client computer such that a single request creates said financial advice application;

transmit said financial advice application to said client computer, wherein said financial advice application is fully executable at said client computer;

receive a completed data entry page including field data based on said data requirements and said plurality of financial advice services, wherein said field data is entered by said at least one of said client and said representative;

determine when said field data complies with said data entry rules; and, transmit said field data to said subset, wherein said subset processes said field data to provide said financial planning and advice;

receive said financial planning and advice from each of said subset;

format said financial planning and advice received from each of said subset to a standardized data format;

compare said financial planning and advice to stored economic group data, and, determine specific strategies for said financial planning and advice based upon said comparison of said stored economic group data.

22. The device of claim 21, wherein said financial advice application further includes at least one of a headless utility, a leased storage service, a formatting service, a library service, a repository service, a simulator service, an asset allocation service, a business graphics service, and an equity evaluation service.

23. The device of claim 21, wherein said central processor is further operative with a data migration mechanism configured to convert data transmissions between said client computer and said financial advice application into a standardized data format.

24. The device of claim 23, wherein said standardized data format is XML.

25. The device of claim 21, wherein said central processor is further operative with a translator configured to translate data transmissions between said plurality of distinct financial advice services into a standardized data format.

26. The device of claim 25, wherein said standardized data format is XML.

27. The device of claim 21, wherein said central processor is further operative with a registration application configured to allocate a TCP/IP port for use by said financial advice application during a client session.

28. A method of using a financial advice application, comprising:

implementing a financial advice application comprising at least one of establishing a connection to a Web server and accessing said financial advice application on a desktop wherein data transmitted between a financial advice application and at least one of a Web server and a desktop is in a standardized data format;

receiving, from a plurality of disparate providers, a plurality of distinct financial advice services, wherein each of said a plurality of distinct financial advice services comprises executable code;

receiving a request including financial data at said financial advice service, wherein said financial data is related current financial position and a lifetime goal of an entity;

evaluating said request to identify a subset of said plurality of distinct financial advice services based on said current financial position and a lifetime goal of an entity, wherein said lifetime goal is related to at least one of education, wealth accumulation, retirement, estate planning, tax planning, survivorship, disability, and long-term care from said advice utility server;

compiling data requirements unique to said entity based on said current financial position and said lifetime goal, wherein said data requirements include format and value properties in accordance with said subset;

compiling a data entry page having fields for collecting information relating to said financial need, preferred financial strategy and economic class based on said data requirements, wherein said fields are populated by at least one of said client and a representative of said client via a client computer, to create fields populated with said information relating to said financial need, preferred financial strategy and economic class;

applying to said fields said format and said value properties as metadata to enforce data entry rules;

transmitting said financial data to said client computer in the form of a financial advice application, wherein said financial advice application is fully executable at said client computer;

processing instructions configured to direct a computer to perform the step of scripting requests from said application program such that a single request creates said financial advice application;

receiving a completed data entry page including field data based on said data requirements and said subset, wherein said field data is entered by said at least one of said client and said representative;

determining when said field data complies with said data entry rules;

formatting said field data into a format that is usable by each of said subset;

transmitting said field data to said subset, wherein said subset processes said field data to provide said financial planning and advice;

receiving said financial planning and advice from each of said subset;

formatting said financial planning and advice received from each of said subset to a standardized data format;

comparing said financial planning and advice to stored economic group data, and, determining specific strategies for said financial planning and advice based upon said comparison of said stored economic group data.

29. The method of claim 28, wherein said standardized data format is XML.

30. The method of claim 28, wherein said financial advice application further comprises at least one of a headless utility, a leased storage service, a formatting service, a library service, a repository service, a simulator service, an asset allocation service, a business graphics service, and an equity evaluation service.

31. The method of claim 28, wherein said financial advice application comprises an application services manager.

32. A method for providing comprehensive online financial planning advice, the method comprising:

receiving, from a plurality of disparate providers, a plurality of distinct financial advice services, wherein each of said a plurality of distinct financial advice services comprises executable code;

establishing a connection to a client computer having an application program comprising a module, wherein said module corresponds to a financial advice service;

receiving user-supplied data and a request for a financial advice service, wherein said user-supplied data comprises at least one of economic group data and goals and wherein said economic group data comprises at least one of membership data, demographics data, and financial data and wherein said financial advice application includes a roadmap service configured to use financial data to provide financial planning and advice;

evaluating economic group data to identify said plurality of distinct financial advice services, wherein said economic group data is defined by a current financial position and a lifetime goal of an entity, wherein the lifetime goal is related to at least one of education, wealth accumulation, retirement, estate planning, tax planning, survivorship, disability, and long-term care;

identifying a subset of said plurality of distinct financial advice services based on financial need, preferred financial strategy and economic class;

compiling data requirements unique to said entity based on said current financial position and said lifetime goal, wherein said data requirements include format and value properties in accordance with said subset;

compiling a data entry page having fields for collecting information relating to said financial need, preferred financial strategy and economic class based on said data requirements, wherein said fields are populated by at least one of said client and a representative of said client via a client computer, to create fields populated with said information relating to said financial need, preferred financial strategy and economic class;

applying to said fields said format and said value properties as metadata to enforce data entry rules;

transmitting said financial data to said client computer in the form of a financial advice application, wherein said financial advice application is fully executable at said client computer;

transmitting and displaying said financial planning and advice results to said user;

processing instructions configured to direct a computer to perform the step of scripting requests such that a single request creates said financial advice application;

receiving a completed data entry page including field data based on said data requirements and said subset, wherein said field data is entered by said at least one of said client and said representative;

determining when said field data complies with said data entry rules;

formatting said field data into a format that is usable by each of said subset;

transmitting said field data to said subset, wherein said subset processes said field data to provide said financial planning and advice;

receiving said financial planning and advice from each of said subset;

formatting said financial planning and advice received from each of said subset to a standardized data format;

comparing said financial planning and advice to stored economic group data, and, determining specific strategies for said financial planning and advice based upon said comparison of said stored economic group data.

* * * * *